United States Patent
Tonami et al.

(10) Patent No.: US 7,251,060 B2
(45) Date of Patent: Jul. 31, 2007

(54) IMAGE-PROCESSING DEVICE USING QUANTIZATION THRESHOLD VALUES PRODUCED ACCORDING TO A DITHER THRESHOLD MATRIX AND ARRANGING DOT-ON PIXELS IN A PLURAL-PIXEL FIELD ACCORDING TO THE DITHER THRESHOLD MATRIX

(75) Inventors: Kazunari Tonami, Tokyo (JP); Hiroshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1037 days.

(21) Appl. No.: 10/006,377

(22) Filed: Dec. 10, 2001

(65) Prior Publication Data
US 2002/0080377 A1 Jun. 27, 2002

(30) Foreign Application Priority Data
Dec. 12, 2000 (JP) .............................. 2000-377713
May 21, 2001 (JP) .............................. 2001-150608

(51) Int. Cl.
*G06K 15/00* (2006.01)
*H04N 1/405* (2006.01)

(52) U.S. Cl. ..................................... 358/3.16; 358/3.19
(58) Field of Classification Search .............. 358/3.01, 358/3.06, 3.13, 3.16, 3.17, 3.19, 534, 535, 358/536

See application file for complete search history.

(56) References Cited

U.S. PATENT DOCUMENTS 5,014,091 A 5/1991 Koike et al.
5,061,962 A 10/1991 Takahashi
5,107,346 A * 4/1992 Bowers et al. .............. 358/447

(Continued)

FOREIGN PATENT DOCUMENTS

JP 64-019873 1/1989

(Continued)

OTHER PUBLICATIONS

U.S. Appl. No. 10/006,377, filed Dec. 10, 2001, Tonami et al.

(Continued)

*Primary Examiner*—Thomas D. Lee
(74) *Attorney, Agent, or Firm*—Oblon, Spivak, McClelland, Maier & Neustadt, P.C.

(57) ABSTRACT

The image-processing device comprises a quantization threshold produce unit producing quantization threshold values corresponding to each pixel of multivalued image data according to a dither threshold matrix, a random dither quantize unit quantizing the multivalued image data in multivalues by a random dither process using the quantization threshold values so as to output quantized data, and a resolution convert binarize unit converting the quantized data into binary image data having a resolution higher than that of the multivalued image data. The resolution convert binarize unit determines the number of dot-on pixels to be output in a plural-pixel field of the binary image data according to the quantized data value of a pixel being processed of the multivalued image data. The plural-pixel field corresponds to the pixel. The resolution convert binarize unit also controls the order of arranging the dot-on pixels in the plural-pixel field according to a position on the dither threshold matrix corresponding to the pixel.

43 Claims, 21 Drawing Sheets

U.S. PATENT DOCUMENTS

| | | |
|---|---|---|
| 5,115,257 A | 5/1992 | Takahashi |
| 5,280,362 A | 1/1994 | Noguchi et al. |
| 5,444,518 A | 8/1995 | Hashiguchi et al. |
| 5,751,854 A | 5/1998 | Saitoh et al. |
| 5,801,844 A | 9/1998 | Yamakawa et al. |
| 5,822,502 A * | 10/1998 | Li et al. ............... 358/1.9 |
| 6,272,248 B1 | 8/2001 | Saitoh et al. |
| 6,515,768 B1 * | 2/2003 | Deschuytere et al. ...... 358/3.06 |
| 6,977,757 B1 | 12/2005 | Takahashi et al. |

FOREIGN PATENT DOCUMENTS

| | | |
|---|---|---|
| JP | 7-295527 | 11/1995 |
| JP | 10-056569 | 2/1998 |
| JP | 10-191038 | 7/1998 |
| JP | 11-155064 | 6/1999 |
| JP | 2000-101837 | 4/2000 |
| JP | 2000-332995 | 11/2000 |

OTHER PUBLICATIONS

U.S. Appl. No. 10/347,447, filed Jan. 21, 2003, Ogawa et al.
U.S. Appl. No. 10/378,892, filed Mar. 5, 2003, Takahashi et al.
U.S. Appl. No. 10/666,246, filed Sep. 22, 2003, Tonami et al.
U.S. Appl. No. 09/722,270, filed Nov. 28, 2000, Unknown.

* cited by examiner

ONE PIXEL OF 600dpi

| ONE PIXEL OF 1200dpi | | | | | |
|---|---|---|---|---|---|
| 110 | 107 | 104 | 101 | 146 | 167 |
| 113 | 80 | 77 | 98 | 143 | 170 |
| 116 | 83 | 74 | 95 | 140 | 173 |
| 119 | 86 | 89 | 92 | 137 | 176 |
| 122 | 125 | 128 | 131 | 134 | 179 |
| 161 | 158 | 155 | 152 | 149 | 164 |

ONE PIXEL OF 600dpi

| 80 | 77 | 143 |
|---|---|---|
| 83 | 74 | 137 |
| 122 | 128 | 134 |

| 107 | 98 | 146 |
|---|---|---|
| 86 | 89 | 140 |
| 125 | 131 | 149 |

| 110 | 101 | 167 |
|---|---|---|
| 116 | 92 | 173 |
| 158 | 152 | 164 |

| 113 | 104 | 170 |
|---|---|---|
| 119 | 95 | 176 |
| 161 | 155 | 179 |

FIG. 7A

| -1 | -1 | 0 | 1 | 1 |
|----|----|----|----|----|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIG. 7B

| -1 | -1 | -1 | -1 | -1 |
|----|----|----|----|----|
| -1 | -1 | -1 | -1 | -1 |
| 0  | 0  | 0  | 0  | 0  |
| 1  | 1  | 1  | 1  | 1  |
| 1  | 1  | 1  | 1  | 1  |

FIG. 7C

| -1 | -1 | -1 | -1 | 0 |
|----|----|----|----|----|
| -1 | -1 | -1 | 0  | 1 |
| -1 | -1 | 0  | 1  | 1 |
| -1 | 0  | 0  | 1  | 1 |
| 0  | 1  | 1  | 1  | 1 |

FIG. 7D

| 0  | 1  | 1  | 1  | 1 |
|----|----|----|----|----|
| -1 | 0  | 1  | 1  | 1 |
| -1 | -1 | 0  | 1  | 1 |
| -1 | -1 | -1 | 0  | 1 |
| -1 | -1 | -1 | -1 | 0 |

FIG. 8

ONE PIXEL OF 600dpi

| ONE PIXEL OF 1200dpi | | | | | | | | | | | |
|---|---|---|---|---|---|---|---|---|---|---|---|
| -6 | -7 | -8 | -9 | 6 | 13 | -2 | -1 | 0 | 1 | 2 | 17 |
| -5 | -17 | -17 | -10 | 5 | 14 | 11 | 10 | 9 | 8 | 7 | 12 |
| -4 | -17 | -17 | -11 | 4 | 15 | -6 | -7 | -8 | -9 | 6 | 13 |
| -3 | -14 | -13 | -12 | 3 | 16 | -5 | -17 | -17 | -10 | 5 | 14 |
| -2 | -1 | 0 | 1 | 2 | 17 | -4 | -17 | -17 | -11 | 4 | 15 |
| 11 | 10 | 9 | 8 | 7 | 12 | -3 | -14 | -13 | -12 | 3 | 16 |

FIG. 9A

ONE PIXEL OF 600dpi

| -17 | -17 | 5 | -2 | 0 | 2 |
|---|---|---|---|---|---|
| -17 | -17 | 3 | -17 | -17 | 5 |
| -2 | 0 | 2 | -17 | -17 | 3 |

FIG. 9B

| -7 | -10 | 6 | -1 | 1 | 7 |
|---|---|---|---|---|---|
| -14 | -12 | 4 | -7 | -10 | 6 |
| -1 | 1 | 7 | -14 | -12 | 4 |

FIG. 9C

| -6 | -9 | 13 | 10 | 8 | 12 |
|---|---|---|---|---|---|
| -4 | -11 | 15 | -6 | -9 | 13 |
| 10 | 8 | 12 | -4 | -11 | 15 |

FIG. 9D

| -5 | -8 | 14 | 11 | 9 | 17 |
|---|---|---|---|---|---|
| -3 | 13 | 16 | -5 | -8 | 14 |
| 11 | 9 | 17 | -3 | 13 | 16 |

FIG. 10A

ONE PIXEL OF 600dpi

| 77 | 77 | 143 | 122 | 128 | 134 |
|---|---|---|---|---|---|
| 77 | 77 | 137 | 77 | 77 | 143 |
| 122 | 128 | 134 | 77 | 77 | 137 |

FIG. 10B

| 107 | 98 | 146 | 125 | 131 | 149 |
|---|---|---|---|---|---|
| 86 | 89 | 140 | 107 | 98 | 146 |
| 125 | 131 | 149 | 86 | 89 | 140 |

FIG. 10C

| 110 | 101 | 167 | 158 | 152 | 164 |
|---|---|---|---|---|---|
| 116 | 92 | 173 | 110 | 101 | 167 |
| 158 | 152 | 164 | 116 | 92 | 173 |

FIG. 10D

| 113 | 104 | 170 | 161 | 155 | 179 |
|---|---|---|---|---|---|
| 119 | 95 | 176 | 113 | 104 | 170 |
| 161 | 155 | 179 | 119 | 95 | 176 |

FIG. 11A

ONE PIXEL OF 600dpi

| 94 | 94 | 138 | 124 | 128 | 132 |
|---|---|---|---|---|---|
| 94 | 94 | 134 | 94 | 94 | 138 |
| 124 | 128 | 132 | 94 | 94 | 134 |

FIG. 11B

| 114 | 108 | 140 | 126 | 130 | 142 |
|---|---|---|---|---|---|
| 100 | 104 | 136 | 114 | 108 | 140 |
| 126 | 130 | 142 | 100 | 104 | 136 |

FIG. 11C

| 116 | 110 | 154 | 148 | 144 | 152 |
|---|---|---|---|---|---|
| 120 | 106 | 158 | 116 | 110 | 154 |
| 148 | 144 | 152 | 120 | 106 | 158 |

FIG. 11D

| 118 | 112 | 156 | 150 | 146 | 162 |
|---|---|---|---|---|---|
| 122 | 154 | 160 | 118 | 112 | 156 |
| 150 | 146 | 162 | 122 | 154 | 160 |

FIG. 12A

ONE PIXEL OF 600dpi

| 111 | 111 | 133 | 126 | 128 | 130 |
|-----|-----|-----|-----|-----|-----|
| 111 | 111 | 131 | 111 | 111 | 133 |
| 126 | 128 | 130 | 111 | 111 | 131 |

FIG. 12B

| 121 | 118 | 134 | 127 | 129 | 135 |
|-----|-----|-----|-----|-----|-----|
| 114 | 116 | 132 | 121 | 118 | 134 |
| 127 | 129 | 135 | 114 | 116 | 132 |

FIG. 12C

| 122 | 119 | 141 | 138 | 136 | 140 |
|-----|-----|-----|-----|-----|-----|
| 124 | 117 | 143 | 122 | 119 | 141 |
| 138 | 136 | 140 | 124 | 117 | 143 |

FIG. 12D

| 123 | 120 | 142 | 139 | 137 | 145 |
|-----|-----|-----|-----|-----|-----|
| 125 | 141 | 144 | 123 | 120 | 142 |
| 139 | 137 | 145 | 125 | 141 | 144 |

FIG. 13A

| -1 | 0 | 1 |
|----|---|---|
| -1 | 0 | 1 |
| -1 | 0 | 1 |

FIG. 13B

| -1 | -1 | -1 |
|----|----|----|
| 0  | 0  | 0  |
| 1  | 1  | 1  |

FIG. 13C

| 1  | 1  | 0 | -1 | -1 |
|----|----|---|----|----|
| 1  | 1  | 0 | -1 | -1 |
| 0  | 0  | 0 | 0  | 0  |
| -1 | -1 | 0 | 1  | 1  |
| -1 | -1 | 0 | 1  | 1  |

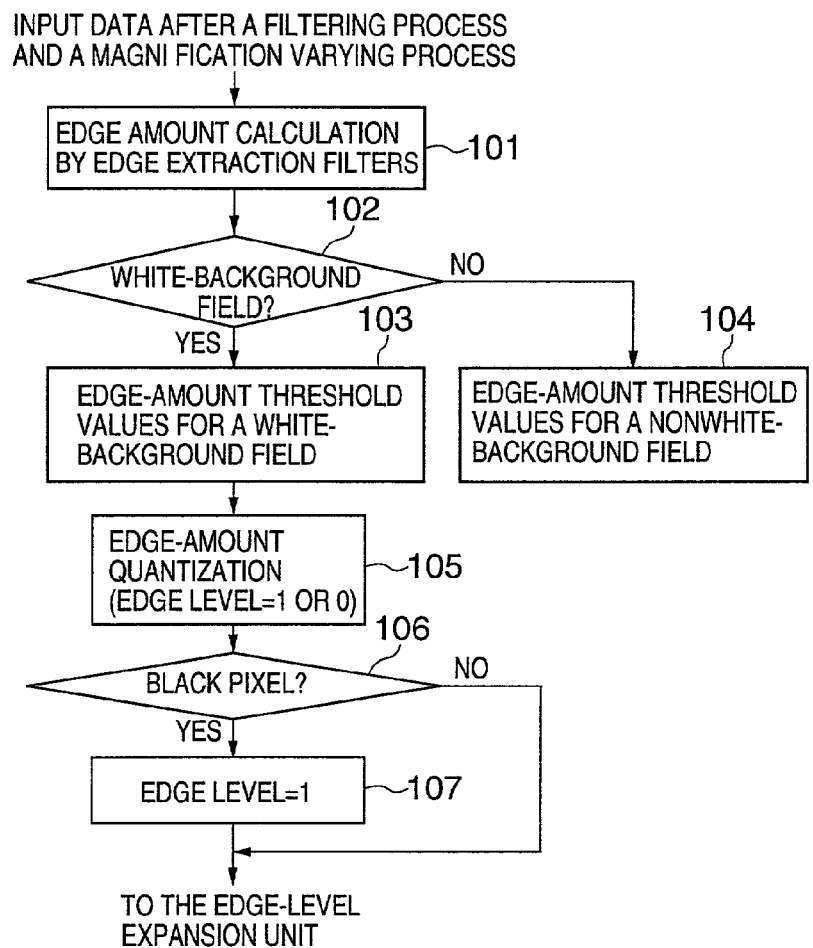

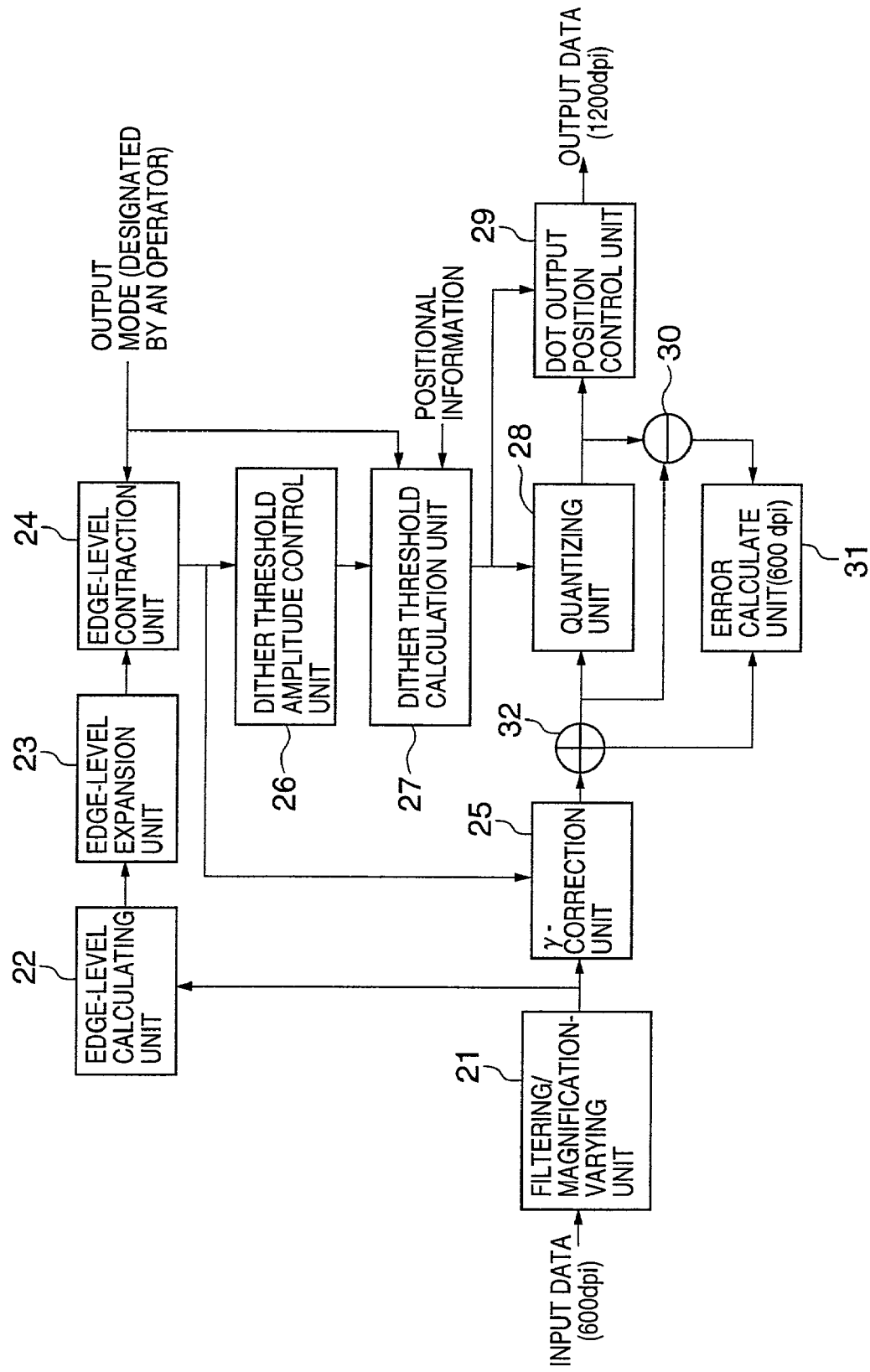

FIG.26

ONE PIXEL OF 600dpi →

ONE PIXEL OF 1200dpi ↓

| 12 | 11 | 10 | 9 | 8 | 7 | 16 | -3 | -14 | -13 | -12 | 3 |
|---|---|---|---|---|---|---|---|---|---|---|---|
| 13 | -6 | -7 | -8 | -9 | 6 | 17 | -2 | -1 | 0 | 1 | 2 |
| 14 | -5 | -17 | -17 | -10 | 5 | 12 | 11 | 10 | 9 | 8 | 7 |
| 15 | -4 | -17 | -17 | -11 | 4 | 13 | -6 | -7 | -8 | -9 | 6 |
| 16 | -3 | -14 | -13 | -12 | 3 | 14 | -5 | -17 | -17 | -10 | 5 |
| 17 | -2 | -1 | 0 | 1 | 2 | 15 | -4 | -17 | -17 | -11 | 4 |

FIG.27

ONE PIXEL OF 600dpi →

ONE PIXEL OF 1200dpi ↓

| -6 | -7 | -8 | -9 | 6 | 13 | -2 | -1 | 0 | 1 | 2 | 17 |
|---|---|---|---|---|---|---|---|---|---|---|---|
| -5 | -16 | -17 | -10 | 5 | 14 | 11 | 10 | 9 | 8 | 7 | 12 |
| -4 | -15 | -18 | -11 | 4 | 15 | -6 | -7 | -8 | -9 | 6 | 13 |
| -3 | -14 | -13 | -12 | 3 | 16 | -5 | -17 | -17 | -10 | 5 | 14 |
| -2 | -1 | 0 | 1 | 2 | 17 | -4 | -17 | -17 | -11 | 4 | 15 |
| 11 | 10 | 9 | 8 | 7 | 12 | -3 | -14 | -13 | -12 | 3 | 16 |

FIG.28

ONE PIXEL OF 600dpi
ONE PIXEL OF 1200dpi

| 164 | 161 | 158 | 155 | 152 | 149 | 176 | 119 | 86 | 89 | 92 | 137 |
|---|---|---|---|---|---|---|---|---|---|---|---|
| 167 | 110 | 107 | 104 | 101 | 146 | 179 | 122 | 125 | 128 | 131 | 134 |
| 170 | 113 | 77 | 77 | 98 | 143 | 164 | 161 | 158 | 155 | 152 | 149 |
| 173 | 116 | 77 | 77 | 95 | 140 | 167 | 110 | 107 | 104 | 101 | 146 |
| 176 | 119 | 86 | 89 | 92 | 137 | 170 | 113 | 77 | 77 | 98 | 143 |
| 179 | 122 | 125 | 128 | 131 | 134 | 173 | 116 | 77 | 77 | 95 | 140 |

FIG.29A

ONE PIXEL OF 600dpi

| 110 | 104 | 101 | 119 | 86 | 92 |
|---|---|---|---|---|---|
| 113 | 77 | 95 | 110 | 104 | 101 |
| 119 | 86 | 92 | 113 | 77 | 95 |

FIG.29B

| 161 | 107 | 146 | 122 | 89 | 131 |
|---|---|---|---|---|---|
| 116 | 77 | 98 | 161 | 107 | 146 |
| 122 | 89 | 131 | 116 | 77 | 98 |

FIG.29C

| 164 | 155 | 149 | 176 | 125 | 134 |
|---|---|---|---|---|---|
| 170 | 77 | 140 | 164 | 155 | 149 |
| 176 | 125 | 134 | 170 | 77 | 140 |

FIG.29D

| 167 | 158 | 152 | 179 | 128 | 137 |
|---|---|---|---|---|---|
| 173 | 77 | 143 | 167 | 158 | 152 |
| 179 | 128 | 137 | 173 | 77 | 143 |

IMAGE-PROCESSING DEVICE USING QUANTIZATION THRESHOLD VALUES PRODUCED ACCORDING TO A DITHER THRESHOLD MATRIX AND ARRANGING DOT-ON PIXELS IN A PLURAL-PIXEL FIELD ACCORDING TO THE DITHER THRESHOLD MATRIX

BACKGROUND OF THE INVENTION

1. Field of the Invention

The present invention generally relates to a field of image processing, and more particularly, to a field of an image forming or displaying device applicable to a laser printer, a digital copying machine, a color laser printer and a facsimile device.

2. Description of the Related Art

Conventionally, the dither method, the density pattern method, and the random dither method are generally used as a middle-tone reproducing method in an image-forming device, such as a laser printer, a digital copying machine, a color laser printer and a facsimile device.

The dither method expresses the gradation with a plurality of pixels, and expresses colors with the combination thereof in a color image. The dither method used in a general printing is excellent in granularity, and expresses a smooth middle-tone image. In the so-called area gradation methods represented by the dither method, a resolution is deteriorated in exchange for obtaining a gradation. Additionally, with respect to a print image like dots, the dither method producing periodic images tends to generate moirés.

The random dither method is a method for expressing gradation while maintaining resolution. The random dither method is suitable to a reproduction of a text image because the random dither method can obtain a resolution faithful to the original image. However, the random dither method may possibly produce a peculiar texture with respect to a halftone image such as a photographic part because isolate dots are scattered or arranged in irregular connections to deteriorate granularity. Especially in an electrophotographic printer, since an image is formed by isolate dots, a deterioration of granularity or a banding tends to occur in the unstable image due to uneven density.

By the way, regarding an image-forming device and the like, it may sometimes be desired to convert multivalued image data of low resolution into binary image data of high resolution. Applying the random dither method to this case conceivably involves a method of providing the multivalued image data with high resolution prior to a random dither process. However, the random dither process is a complicated and time-consuming process because the random dither process performs a product-sum calculation to diffuse quantization errors of peripheral pixels. Specifically, the number of pixels in a unit area increases as the resolution of the binary image data becomes higher, and the calculation amount and the processing time of the random dither process increase in approximate proportion to the number of pixels in a unit area. Thus, for example, when the resolution varies from 600 dpi to 1200 dpi and 2400 dpi, the number of pixels in a unit area increases 4 times and 16 times, respectively, in proportion to the square of the resolution; therefore, the calculation amount and the processing time have to increase largely. Hence, in order to maintain productivity, the process needs to be performed at a higher speed to compensate for the increased calculation amount and restrain the increase in the processing time.

An effective method to restrain the increase in the processing time is quantizing the multivalued image data of low resolution by the random dither process, and thereafter converting the multivalued image data of low resolution into the binary image data of high resolution, because this method reduces a calculation amount and a circuit scale required for the random dither process, compared to quantizing image data of high resolution.

An example of a device realizing such a conventional technology can be found in Japanese Laid-Open Patent Application No. 07-295527. In this technology, after multivalued image data of low resolution (600 dpi) is quantized in multivalues by the random dither process, the multivalued image data is converted into binary image data of high resolution (1200 dpi) by the density pattern method or the dither method.

Another example of a method realizing such a conventional technology can be found in Japanese Laid-Open Patent Application No. 11-155064. In this technology, after data of low resolution (600 dpi) is binarized by the random dither process, the data is converted into binary image data of high resolution (1200 dpi) by pattern matching.

Objects of the above-mentioned device (Japanese Laid-Open Patent Application No. 07-295527) are to increase the processing speed, reduce the calculation time, and prevent the circuit scale from increasing due to a buffer memory, while achieving binary image signal having sufficient gradations at a high speed. Another object of this device is to inhibit moirés and Rosetta patterns. In order to achieve these objects, this conventional device performs a gradation process reducing the number of gradations per pixel by the multivalued random dither process, and based on the result thereof, performs another gradation process, i.e., the density pattern method. However, since dots are arranged by a simple method, such as the density pattern method or the dither method, it is difficult to increase the quality of an image formed by a printer performing a high-density writing of 1200 dpi or more, especially an electrophotographic printer in which dots are reproduced less clearly as the dots become denser. Additionally, arranging dots by the density pattern method or the dither method inflicts periodicity on an image, and may possibly generate moirés.

The above-mentioned method (Japanese Laid-Open Patent Application No. 11-155064) attempts to make a large improvement in granularity at a highlight part by using a little buffer memory and performing a few processes. However, no particular change or remarkably improved quality can be observed in an output image, compared to the random dither process of 600 dpi.

SUMMARY OF THE INVENTION

It is a general object of the present invention to provide an improved and useful image-processing device and method in which the above-mentioned problems are eliminated.

A more specific object of the present invention is to provide an image-processing device and an image-processing method for generating binary image data of high resolution from multivalued image data of low resolution at a high speed so as to form an image with excellent qualities, such as granularity and resolution, from the binary image data, and to provide an image-forming device which can perform a random dither process at a high speed in an electrophotographic printer performing a high-density writing while improving image qualities, such as granularity and resolution.

In order to achieve the above-mentioned objects, there is provided according to one aspect of the present invention an image-processing device comprising:

a quantization threshold produce unit producing a plurality of quantization threshold values corresponding to each of pixels of multivalued image data according to a dither threshold matrix;

a random dither quantize unit quantizing the multivalued image data in multivalues by a random dither process using the quantization threshold values so as to output quantized data; and a resolution convert binarize unit converting the quantized data into binary image data having a resolution higher than a resolution of the multivalued image data, wherein the resolution convert binarize unit determines the number of dot-on pixels to be output in a plural-pixel field of the binary image data according to a value of the quantized data of a pixel being processed of the multivalued image data, the plural-pixel field corresponding to the pixel being processed, and controls the order of arranging the dot-on pixels in the plural-pixel field according to a position on the dither threshold matrix corresponding to the pixel being processed.

Additionally, in the image-processing device according to the present invention, the order of arranging the dot-on pixels may be controlled so as to form dots of a dot-concentrated type.

Additionally, in the image-processing device according to the present invention, the dither threshold matrix may contain threshold values so arranged as to form the dots of the dot-concentrated type.

Additionally, in the image-processing device according to the present invention, smallest four threshold values among the threshold values in the dither threshold matrix may be arranged at different pixel positions.

Additionally, in the image-processing device according to the present invention, the difference between a fourth smallest threshold value and a fifth smallest threshold value in the dither threshold matrix may be larger than a step width of the dither threshold matrix.

Additionally, in the image-processing device according to the present invention, the dither threshold matrix may comprise at least two basic dither threshold matrixes containing the threshold values so arranged as to form the dots of the dot-concentrated type, the two basic dither threshold matrixes being joined in a main scanning direction at a position shifted in a sub-scanning direction.

Additionally, the image-processing device according to the present invention may further comprise an image characteristic extract unit extracting an image characteristic of the multivalued image data, wherein the quantization threshold produce unit may control amplitude of the quantization threshold values according to a characteristic amount output by the image characteristic extract unit.

Additionally, in the image-processing device according to the present invention, the quantization threshold produce unit may control the amplitude of the quantization threshold values by switching the dither threshold matrix used for producing the quantization threshold values.

Additionally, in the image-processing device according to the present invention, the image characteristic extract unit may output an edge amount of the multivalued image data as the characteristic amount, and the quantization threshold produce unit may make the amplitude of the quantization threshold values smaller as the edge amount becomes larger.

Additionally, in the image-processing device according to the present invention, the image characteristic extract unit may output the edge amount of the multivalued image data after subjecting the edge amount to an expanding process for expanding an edge field of the multivalued image data.

Additionally, in the image-processing device according to the present invention, the image characteristic extract unit may output the edge amount of the multivalued image data after equalizing the edge amount.

Additionally, in the image-processing device according to the present invention, the quantization threshold produce unit may produce a constant value as the quantization threshold values when the edge amount output by the image characteristic extract unit is maximum.

Additionally, in the image-processing device according to the present invention, the quantization threshold produce unit may produce values varying according to a value of the multivalued image data as the quantization threshold values when the edge amount output by the image characteristic extract unit is maximum.

Additionally, in the image-processing device according to the present invention, the value of the multivalued image data may be an average value in the pixel being processed and adjacent pixels thereof.

Additionally, in the image-processing device according to the present invention, the quantization threshold produce unit may vary the values varying according to the value of the multivalued image data such that the random dither quantize unit quantizes the multivalued image data in a smaller number of multivalues as the value of the multivalued image data becomes larger.

Additionally, in the image-processing device according to the present invention, the resolution convert binarize unit may arrange the dot-on pixels in the plural-pixel field according to a predetermined arranging order when the edge amount output by the image characteristic extract unit is maximum.

According to the present invention, binary image data of high resolution can be generated from multivalued image data of low resolution at a high speed so as to form an image with excellent qualities from the binary image data of high resolution.

In order to achieve the above-mentioned objects, there is also provided according to another aspect of the present invention an image-forming device which converts input multivalued data of low resolution into binary data of high resolution at a high speed by performing a multivalued random dither process using dither threshold values corresponding to an edginess of an image.

Additionally, in the present invention, dither threshold values of a dot-concentrated type are used, and output positions of dots are controlled such that dots are concentrated in a halftone form. Thereby, an image with an excellent granularity and stability can be formed.

In order to achieve the above-mentioned objects, there is also provided according to another aspect of the present invention an image-forming device in which a dither threshold matrix optimal for a designated output mode, and the amplitude of the dither threshold matrix is controlled according to an edginess of an image. Thereby, an image with both an excellent granularity and sharpness can be formed.

Additionally, in the present invention, threshold values used in quantizing an edge amount are changed according to a result of a white-background judgment. Thereby, a text field tends to be recognized as having a maximum edge level. Therefore, an image with an excellent sharpness can be formed. Additionally, high-density dots also tend to be recognized as having a maximum edge level. Therefore, the occurrence of moirés can be prevented.

Additionally, in the present invention, an edge level is subjected to an expanding process and a contracting process. This prevents an excessive spread of a field having a large edge level in an image other than a halftone (dot) image.

Additionally, in the present invention, sizes of an expansion field and a contraction field are changed according to a designated output mode; thereby, the expanding process and the contracting process can be performed optimally for the designated output mode.

Other objects, features and advantages of the present invention will become more apparent from the following detailed description when read in conjunction with the accompanying drawings.

BRIEF DESCRIPTION OF THE DRAWINGS

FIG. 7A to FIG. 7D show examples of edge extraction filters;

FIG. 8 shows an example of a dither coefficient matrix;

FIG. 9A to FIG. 9D show matrixes containing coefficients of the dither coefficient matrix shown in FIG. 8 rearranged for each of the quantization threshold values;

FIG. 10A to FIG. 10D are matrixes of threshold values in a dither threshold matrix used for a field where an edge amount=0 (A=3), rearranged for each of the quantization threshold values;

FIG. 11A to FIG. 11D are matrixes of threshold values in a dither threshold matrix used for a field where the edge amount=1 (A=2), rearranged for each of the quantization threshold values;

FIG. 12A to FIG. 12D are matrixes of threshold values in a dither threshold matrix used for a field where the edge amount=2 (A=1), rearranged for each of the quantization threshold values;

FIG. 13A to FIG. 13C show other examples of edge extraction filters;

FIG. 23 is a flowchart of an edge-level calculating process;

FIG. 24A to FIG. 24D show other examples of edge extraction filters;

FIG. 25 is a block diagram showing a configuration of a seventh embodiment of the present invention;

FIG. 26 shows a dither coefficient matrix corresponding to a text mode;

FIG. 27 shows a dither coefficient matrix corresponding to a text/photograph mode;

FIG. 28 shows a dither threshold matrix for 1200 dpi corresponding to the text mode with a step width=3; and FIG. 29A to FIG. 29D show four 3×5 dither threshold matrixes corresponding to the text mode with the step width=3.

DETAILED DESCRIPTION OF THE PREFERRED EMBODIMENTS

A description will now be given, with reference to the drawings, of embodiments according to the present invention. In order to avoid making duplicated descriptions, identical or correspondent elements in a plurality of figures are referenced by identical or similar reference marks.

Embodiment 1

Figure 1:
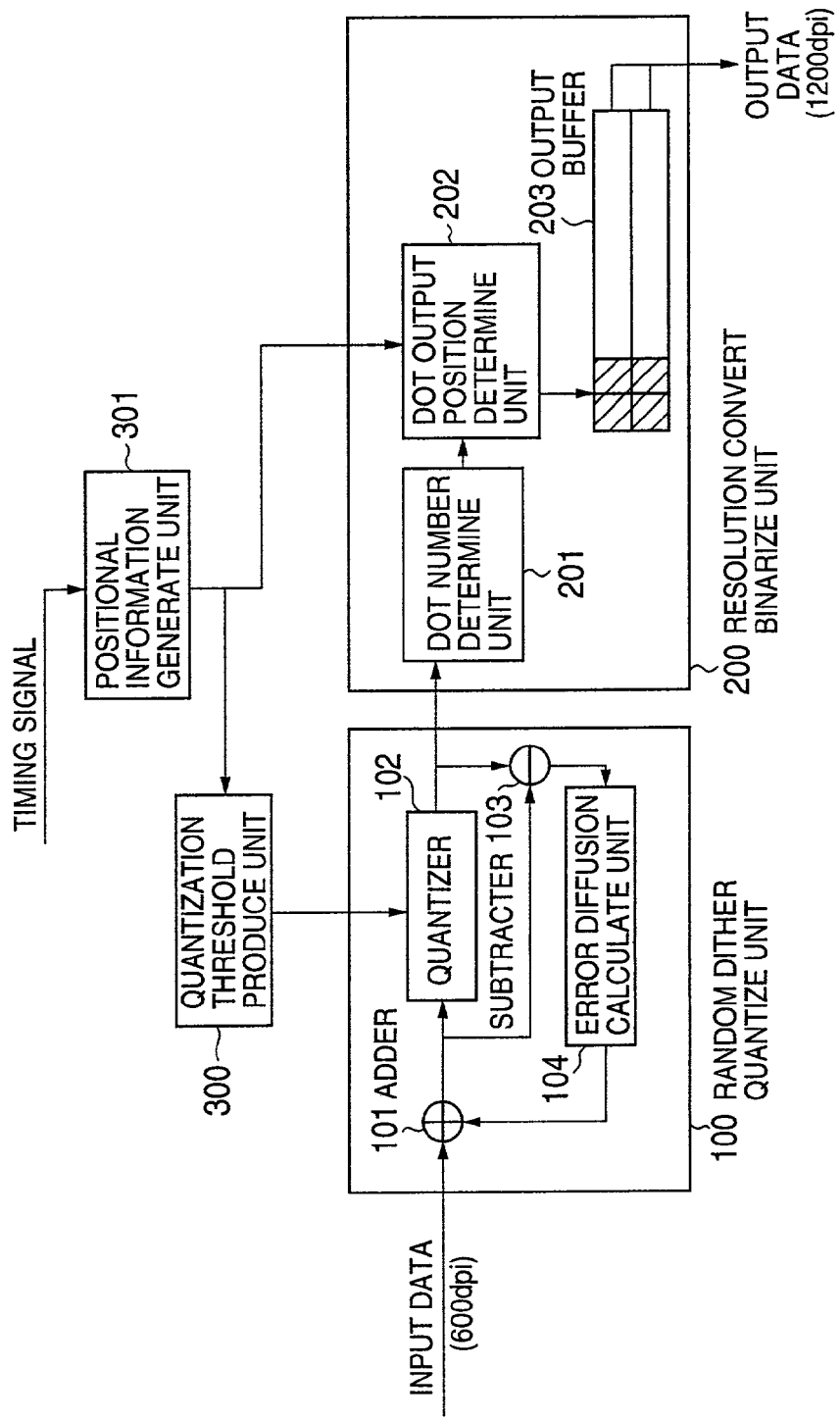
FIG. 1 is a block diagram of an image-processing device according to a first embodiment of the present invention.

FIG. 1 is a block diagram of an image-processing device according to a first embodiment of the present invention. This image-processing device receives image data having a resolution of 600 dpi and 256 gradations (8 bits/pixel) as input data, and outputs binary image data (on/off of dots) having a resolution of 1200 dpi.

As shown in FIG. 1, this image-processing device comprises a random dither quantize unit 100, a resolution convert binarize unit 200, a quantization threshold produce unit 300, and a positional information generate unit 301. The random dither quantize unit 100 quantizes the input data in five values by a random dither process. The resolution convert binarize unit 200 converts the quantized data into the binary image data of 1200 dpi. The quantization threshold produce unit 300 produces periodically varying quantization threshold values (Thr1, Thr2, Thr3 and Thr4) corresponding to each pixel of the multivalued image data, and supplies the quantization threshold values to the random dither quantize unit 100. The positional information generate unit 301 supplies positional information to the quantization threshold produce unit 300 and the resolution convert binarize unit 200. It is noted that, when positional information is supplied from a source of the multivalued image data, the positional information generate unit 301 can be omitted. In addition, since the positional information generate unit 301 can be realized by a simple counter, the quantization threshold produce unit 300 and the resolution convert binarize unit 200 can incorporate means corresponding to the positional information generate unit 301.

The random dither quantize unit 100 comprises an adder 101 for adding quantization errors of processed pixels to the multivalued image data, a quantizer 102 for quantizing output data of the adder 101 in five values by the four quantization threshold values Thr1, Thr2, Thr3 and Thr4 (Thr1<Thr2<Thr3<Thr4), a subtracter 103 for calculating quantization errors from the input and the output of the quantizer 102, and an error diffusion calculate unit 104 calculating an error amount to be added to a pixel to be processed next from the quantization errors calculated by the subtracter 103 according to a predetermined error matrix, and adding the error amount to the adder 101. The relations between the input value and the output value of the quantizer 102 are as follows:

When input value<Thr1, output value=0;
When Thr1≦input value<Thr2,
output value=64;
When Thr2≦input value<Thr3,
output value=128;
When Thr3≦input value<Thr4,
output value=192;
When Thr4≦input value,
output value=255.

Figures 2, 3A, 3B, 3C, 3D, 4A, 4B:
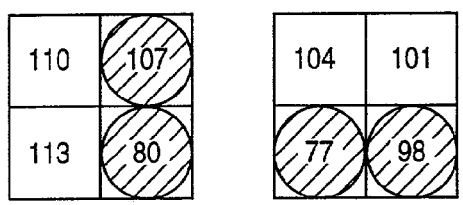
FIG. 2 shows an example of a dither threshold matrix used for producing quantization threshold values.
FIG. 3A to FIG. 3D show dither threshold matrixes of threshold values in the dither threshold matrix shown in FIG. 2 rearranged for each of the quantization threshold values.
FIG. 4A and FIG. 4B are illustrations used for explaining orders of arranging dots.

The quantization threshold produce unit 300 produces the quantization threshold values Thr1 to Thr4 according to a 6×6 dither threshold matrix (3×3 for 600 dpi) as shown in FIG. 2, for example. This dither threshold matrix contains threshold values from 74 to 179 increasing by a step width of 3 arranged in a spiral form in the ascending order, and is a dot-concentrated type forming 200 lines of dots in 1200 dpi. In FIG. 2, four threshold values in each of solid-line grids correspond to one pixel of 600 dpi. As can be observed in FIG. 2, the smallest four threshold values (74, 77, 80, 83) in this dither threshold matrix are arranged at different pixel positions of 600 dpi.

The quantization threshold produce unit 300 outputs four threshold values corresponding to one pixel of 600 dpi in this dither threshold matrix as quantization threshold values corresponding to the pixel. For example, at the top-left pixel position, the quantization threshold produce unit 300 outputs the smallest threshold value of 80 among the four threshold values (80, 107, 110, 113) at this position as the quantization threshold value Thr1, the second smallest threshold value of 107 as the quantization threshold value Thr2, the third smallest threshold value of 110 as the quantization threshold value Thr3, and the largest threshold value of 113 as the quantization threshold value Thr4.

FIG. 3A to FIG. 3D are 3×3 dither threshold matrixes of the threshold values in the dither threshold matrix shown in FIG. 2 rearranged in pixel positions of 600 dpi for each quantization threshold value. FIG. 3A corresponds to the quantization threshold value Thr1. FIG. 3B corresponds to the quantization threshold value Thr2. FIG. 3C corresponds to the quantization threshold value Thr3. FIG. 3D corresponds to the quantization threshold value Thr4.

The positional information generate unit 301 generates the positional information indicating which pixel position (pixel position of 600 dpi) in the dither threshold matrix shown in FIG. 2 a pixel being processed corresponds to. The positional information generate unit 301 comprises, for example, a counter counting timing signals in synchronization with pixels of the multivalued image data.

Specifically, the above-described quantization threshold produce unit 300 retains the dither threshold matrix shown in FIG. 2 or the dither threshold matrixes shown in FIG. 3A to FIG. 3D in such a memory as a ROM, and addresses data in this memory according to the positional information supplied by the positional information generate unit 301 so as to be able to read the four quantization threshold values.

The resolution convert binarize unit 200 converts the data of 600 dpi quantized by the random dither quantize unit 100 into the binary image data of 1200 dpi. The resolution convert binarize unit 200 conceptually comprises a dot number determine unit 201 and a dot output position determine unit 202.

The dot number determine unit 201 determines the number of dot-on pixels (hereinafter referred to as dots) in 2×2 pixels on the binary image data of 1200 dpi which correspond to each pixel on the multivalued image data of 600 dpi. Specifically, the dot number determine unit 201 outputs 0 when the value of the quantized data is 0, outputs 1 when the quantized data value is 64, outputs 2 when the quantized data value is 128, outputs 3 when the quantized data value is 192, and outputs 4 when the quantized data value is 255, a s the number of dots.

Based on the information derived from the dither threshold matrix shown in FIG. 2 and the positional information supplied by the positional information generate unit 301, the dot output position determine unit 202 determines an arrangement of the dots, the number of which is determined by the dot number determine unit 201, in the 2×2 pixel of 1200 dpi, according to a position on the dither threshold matrix corresponding to each pixel being processed. As a more specific example, when the pixel at the top-left position in the dither threshold matrix shown in FIG. 2 is being processed, the dot output position determine unit 202 locates a first dot at a position of the smallest threshold value among the 2×2 threshold values at the top-left position, locates a second dot at a position of the second smallest threshold value, locates a third dot at a position of the third smallest threshold value, and locates a last dot at a position of the largest threshold value. In this example, when the number of dots is 2, the dots are output at two pixel positions at the right side in the 2×2 pixels, as shown in FIG. 4A (the two pixels are dot-on pixels). If the number of dot(s) is 1, the dot is output at the bottom-right pixel position. If the number of dots is 3, the dots are output at the top-left pixel position as well as the two pixel positions at the right side. Similarly, when the pixel at the top-middle position in the dither threshold matrix shown in FIG. 2 is being processed, if the number of dots is 2, the dots are output at two pixel positions at the bottom, as shown in FIG. 4B. As described above, by changing the order of outputting (arranging) the dots according to a position on the dither threshold matrix corresponding to each pixel being processed, dots can be easily formed.

The dot number determine unit 201 can be realized as, for example, a look-up table storing the numbers of dots corresponding to the quantized data values. Similarly, the dot output position determine unit 202 can be realized as a look-up table receiving the number of dots and the positional information as input information, and outputting 2×2 pixel data. Alternatively, the dot number determine unit 201 and the dot output position determine unit 202 can be unitarily realized as, for example, a look-up table receiving the quantized data value and the positional information as input information, and outputting 2×2 pixel data.

The 2×2 pixel data of 1200 dpi corresponding to each pixel of 600 dpi is created by the dot output position determine unit 202, and is buffered in an output buffer 203. For example, a line memory having a capacity of two lines or more is used as this output buffer 203. However, the output buffer can be omitted.

Figure 5:
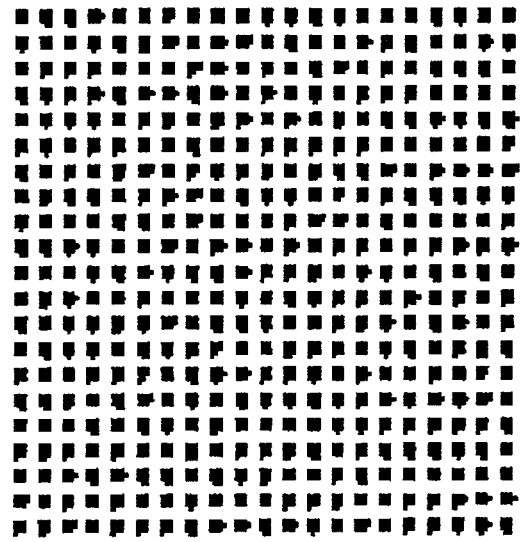
FIG. 5 shows an example of output data of the image-processing device shown in FIG. 1.

As described above, in this image-processing device, the quantization threshold values are generated according to the dither threshold matrix as shown in FIG. 2 containing threshold values so arranged as to form 200 lines of dots of a dot-concentrated type. Also in this image-processing device, the order of arranging dots in a 2×2 pixel field of the binary image data corresponding to each pixel of the multivalued image data of 600 dpi is controlled according to a position on the dither threshold matrix corresponding to the pixel (the arrangement order comes to form dots of the dot-concentrated type as is clear from FIG. 2). This enables the formation of an image with high qualities excellent in stability and granularity. FIG. 5 shows an example of the output data of this image-processing device. This example indicates the formation of 200 lines of dots, which demonstrates excellent stability and granularity. Additionally, since the quantization process by the random dither method is performed to the data of 600 dpi, the quantization process can be performed at a speed by far higher than a quantization process preformed after the resolution of the data is increased to 1200 dpi.

The dither threshold matrix used for producing the quantization threshold values can be replaced by a dither threshold matrix other than the dither threshold matrix of the type of 200-line dots shown in FIG. 2. In this case, it is preferable that the smallest four threshold values (74, 77, 80, 83 in FIG. 2) are arranged at different pixel positions of 600 dpi, as in the dither threshold matrix shown in FIG. 2. By doing this, at a low-density part of an image, when one of pixels corresponding to the four threshold values becomes a dot-on pixel, a negative error is diffused to peripheral pixels; this avoids an unnecessary concentration of dot-on pixels, and therefore, improves evenness of dots at the low-density part.

Embodiment 2

Figure 6:
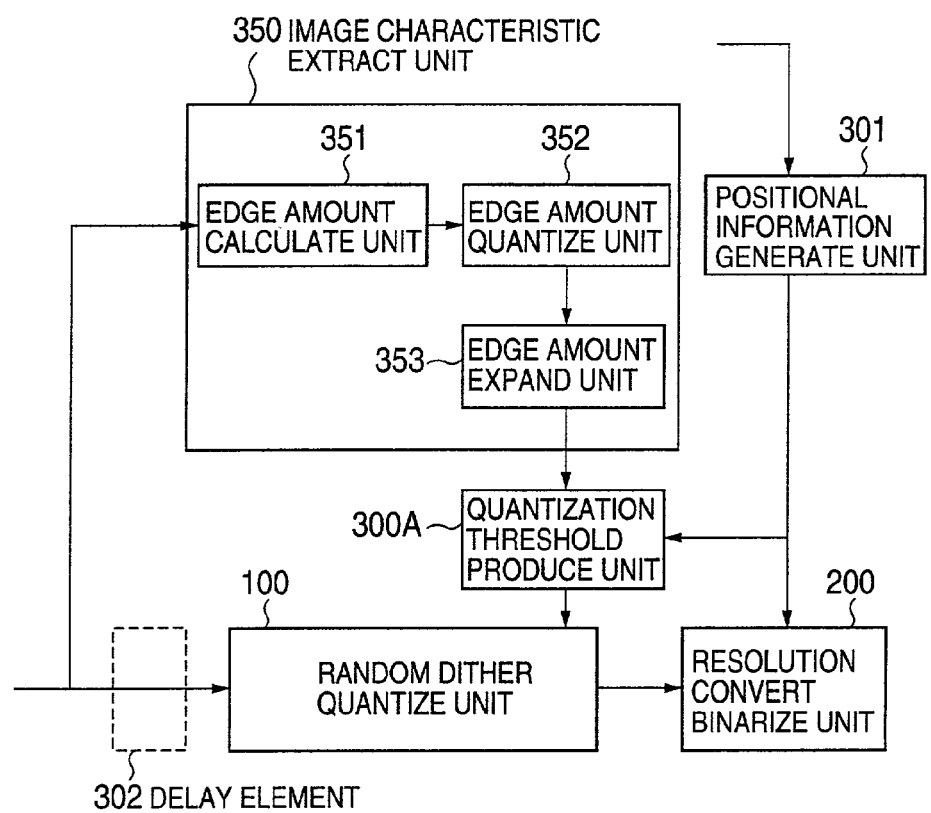
FIG. 6 is a block diagram of an image-processing device according to a second embodiment of the present invention.

FIG. 6 is a block diagram of an image-processing device according to a second embodiment of the present invention. Like the image-processing device shown in FIG. 1, this image-processing device receives multivalued image data of 600 dpi as input data, and outputs binary image data of 1200 dpi. However, the image-processing device shown in FIG. 6 is additionally provided with an image characteristic extract unit 350 for the purpose of controlling amplitude of quantization threshold values according to image characteristics of the input data. Further, a quantization threshold produce unit 300A is so modified as to produce quantization threshold values having the amplitude controlled according to the output of the image characteristic extract unit 350. Besides, a delay element 302 is added at a step preceding the random dither quantize unit 100 for the purpose of a timing adjustment between the image characteristic extract unit 350 and the random dither quantize unit 100. Other the abovementioned points, the image-processing device shown in FIG. 6 has the same structure as the image-processing device shown in FIG. 1.

The image characteristic extract unit 350 comprises an edge amount calculate unit 351, an edge amount quantize unit 352, and an edge amount expand unit 353. The edge amount calculate unit 351 uses, for example, 5×5 filters shown in FIG. 7A to FIG. 7D so as to calculate an edge amount. FIG. 7A shows a filter used for extracting a longitudinal edge. FIG. 7B shows a filter used for extracting a transverse edge. FIG. 7C and FIG. 7D show filters used for extracting slantwise edges. A total of products of the input data in a 5×5 pixel field centered around a pixel being processed and filter coefficients at the corresponding positions is an edge amount obtained by each of the filters, and the largest amount among the edge amounts obtained by all of the filters is output from the edge amount calculate unit 351 as an edge amount of the pixel being processed. This edge amount is quantized in four values from 0 (non-edge field) to 3 (edge field) by the edge amount quantize unit 352, and is supplied to the edge amount expand unit 353.

The edge amount expand unit 353 expands an edge field. Specifically, by referring to the edge amounts in the 5×5 pixel field centered around a pixel being processed, the edge amount expand unit 353 outputs the largest edge amount thereof as an edge amount of the pixel being processed. By performing this expanding process, a non-edge field flanked by edge fields can be converted into an edge field. Thereby, the entire fields in a halftone (dot) image or inside a fine character can be turned into an edge field.

The quantization threshold produce unit 300A produces quantization threshold values according to a dither threshold matrix containing threshold values each obtained by adding 128 to a product of a coefficient corresponding to a pixel position of 600 dpi in a matrix (referred to as a dither coefficient matrix) shown in FIG. 8 and a multiplier A determined by the edge amount (when the edge amount=0, A=3; when the edge amount=1, A=2; when the edge amount=2, A=1; when the edge amount=3, A=0;). For example, when processing pixels corresponding to four coefficients (−17, −7, −6, −5) at the top-left grid shown in FIG. 8, a value calculated by using the smallest coefficient (−17) among these coefficients is output as a quantization threshold value Thr1, a value calculated by using the second smallest coefficient (−7) is output as a quantization threshold value Thr2, a value calculated by using the third smallest coefficient (−6) is output as a quantization threshold value Thr3, and a value calculated by using the largest coefficient (−5) is output as a quantization threshold value Thr4.

FIG. 9A to FIG. 9D are matrixes containing the coefficients of the dither coefficient matrix shown in FIG. 8 rearranged in pixel positions of 600 dpi separately for each of the quantization threshold values Thr1, Thr2, Thr3 and Thr4. FIG. 9A corresponds to the quantization threshold value Thr1. FIG. 9B corresponds to the quantization threshold value Thr2. FIG. 9C corresponds to the quantization threshold value Thr3. FIG. 9D corresponds to the quantization threshold value Thr4.

FIG. 10A to FIG. 10D, FIG. 11A to FIG. 11D, and FIG. 12A to FIG. 12D are matrixes formed by rearranging the dither threshold matrix obtained as described above in pixel positions of 600 dpi separately for each of the quantization threshold values Thr1, Thr2, Thr3 and Thr4. FIG. 10A to FIG. 10D correspond to the case where the edge amount=0 (non-edge field), i.e., A=3. FIG. 11A to FIG. 11D correspond to the case where the edge amount=1 (A=2). FIG. 12A to FIG. 12D correspond to the case where the edge amount=2 (A=1). Besides, when the edge amount is at the maximum of 3 (edge field), A is 0; therefore, the constant value of 128 is output as the four quantization threshold values for all pixel positions.

The dither coefficient matrix of 1200 dpi shown in FIG. 8 comprises two 6×6 (3×3 for 600 dpi) basic matrixes (field enclosed by heavy lines) joined in a main scanning direction while shifted in a sub-scanning direction by one pixel of 600 dpi. Accordingly, the dither threshold matrix obtained by using this dither coefficient matrix also comprises two basic matrixes joined in a main scanning direction while shifted in a sub-scanning direction by one pixel of 600 dpi. Additionally, as clearly understood from the dither coefficient matrix shown in FIG. 8, the dither threshold matrix obtained by using this dither coefficient matrix contains threshold values so arranged as to form 200 lines of dots of a dot-concentrated type in 1200 dpi. Further, the smallest four coefficients (−17, −17, −17, −17) in the basic matrix are arranged at different pixel positions of 600 dpi. Accordingly, the smallest four threshold values in the dither threshold matrix are arranged at different pixel positions of 600 dpi. Furthermore, the difference between the fourth smallest coefficient (−17) and the fifth smallest coefficient (−14) is 3, which is larger than the difference of 1 between other coefficients. This means that, in the dither threshold matrix, the difference between the fourth and fifth smallest threshold values is larger than a step width (the difference between adjacent threshold values when arranged in numerical order).

As one arrangement, the above-described quantization threshold produce unit 300A may retain the dither threshold matrix obtained for each of the edge amounts by using the dither coefficient matrix shown in FIG. 8 or the dither threshold matrixes shown in FIG. 10A to FIG. 10D, FIG. 11A to FIG. 11D, and FIG. 12A to FIG. 12D separately formed for each of the quantization threshold values, in such a memory as a ROM, so as to be able to read quantization threshold values from the memory according to the positional information and the edge amount. As an alternative arrangement, the quantization threshold produce unit 300A may store the dither coefficient matrix shown in FIG. 8 or the dither coefficient matrixes shown in FIG. 9A to FIG. 9D corresponding to each of the quantization threshold values in a memory so as to produce quantization threshold values by adding 128 to a product obtained by multiplying a coefficient read from the memory according to the positional information by the multiplier A corresponding to the edge amount. However, the former arrangement is more advantageous than the latter arrangement because the former arrangement does not need the product-sum calculation and thus can simplify the process and increase the speed thereof.

The random dither quantize unit 100 and the resolution convert binarize unit 200 operate in the same manner as the image-processing device shown in FIG. 1. The dot output position determine unit 202 in the resolution convert binarize unit 200 determines an output position of a dot according to coefficients in the dither coefficient matrix shown in FIG. 8, or according to threshold values in the corresponding dither threshold matrix. However, since each of pixels at a field where the edge amount is 3 (edge field) is binarized in 0 or 255 in the random dither quantize unit 100 using the constant value of 128 as the quantization threshold values, all pixels in the corresponding 2×2 pixel fields in the output data of 1200 dpi become dot-on or dot-off.

According to the above-described structure, 200 lines of dots are formed in a non-edge field of the input data so as to achieve an image with excellent stability and granularity. Additionally, the dither threshold matrix used in the quantization threshold produce unit 300A has phases shifted in the sub-scanning direction as mentioned above; this gives an advantage of the inhibition of the occurrence of a banding. On the other hand, in an edge field of the input data, the binarization using a constant threshold value is performed, and additionally, by the expanding process of the edge amount, the entire fields in a halftone image having a small number of lines of dots or inside a fine character are processed as edge fields; therefore, an image without moirés in a halftone (dot) part can be formed, and an image with an excellent sharpness in a character or a line drawing can be formed. In addition, since the amplitude of quantization threshold values can be switched by degrees from an edge field to a non-edge field, an image with high qualities with little incompatibility at a field between the edge field and the non-edge field can be formed, while achieving both a sharpness in an edge field and a granularity and a stability in the edge field. Further, as described with reference to FIG. 8, the arrangement of the smallest four threshold values in the dither threshold matrix at different pixel positions of 600 dpi avoids an excessive concentration of dots at the low-density part in an image, and therefore, improves a granularity in the low-density part. Furthermore, the difference between the fourth and fifth smallest threshold values is made larger than the step width so that a pixel at the center of dots is made more likely to be a dot-on pixel; this restrains the corruption of dots in a middle-density part and a high-density part of an image.

The extraction filters shown in FIG. 7A to FIG. 7D used in the edge amount calculate unit 351 can be replaced by other filters, such as filters shown in FIG. 13A to FIG. 13C. FIG. 13A shows a filter used for extracting a longitudinal edge. FIG. 13B shows a filter used for extracting a transverse edge. FIG. 13C shows a filter used for extracting 45° dots and a slant line. The difference between the number of 1's (or −1's) in each of the filers shown in FIG. 13A and FIG. 13B and the number of 1's (or −1's) in the filer shown in FIG. 13C creates the difference between the largest edge amount calculated by each of the filers shown in FIG. 13A and FIG. 13B and the largest edge amount calculated by the filer shown in FIG. 13C. Therefore, for example, the edge amount calculated by each of the filers shown in FIG. 13A and FIG. 13B can be multiplied by 1/6, and the edge amount calculated by the filer shown in FIG. 13C can be multiplied by 1/16.

Embodiment 3

Figure 14:
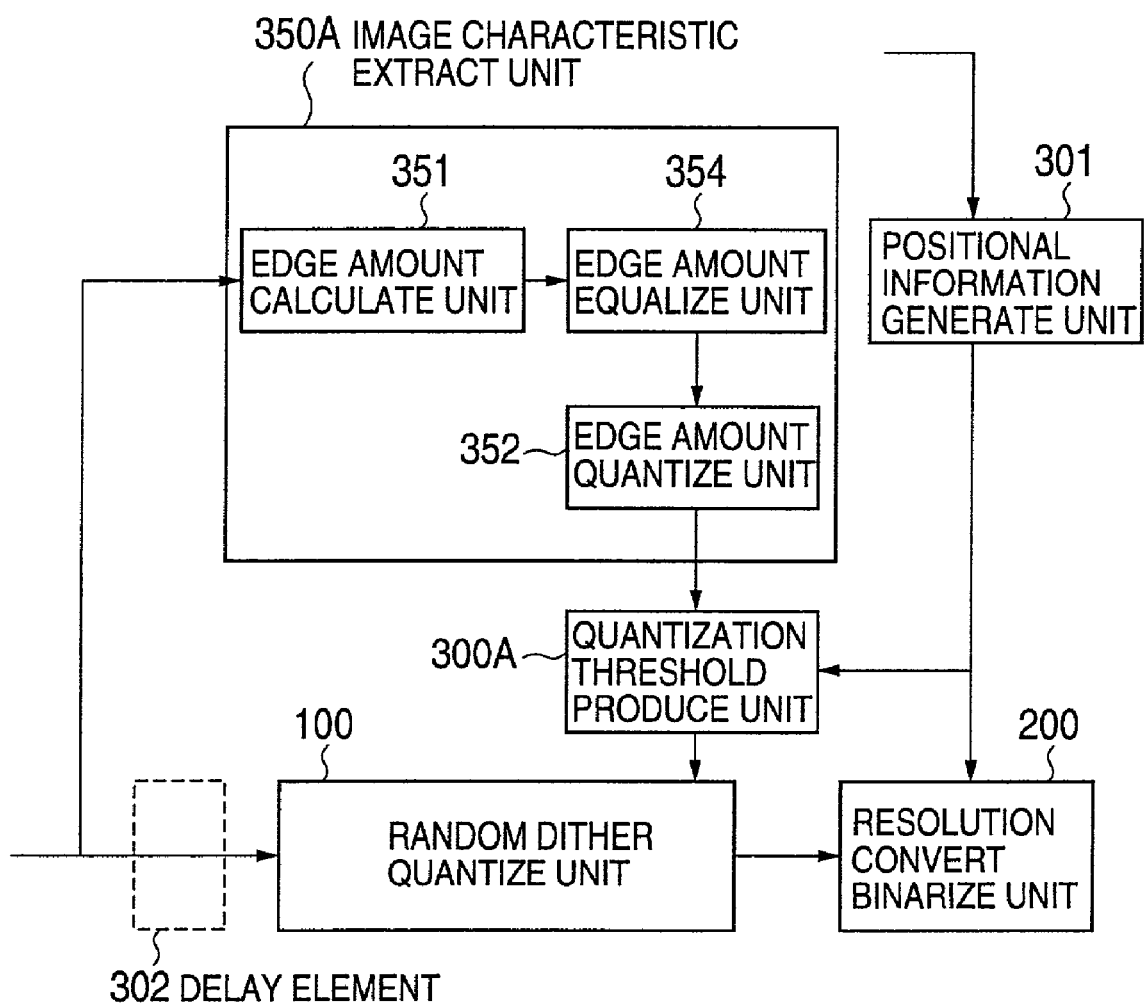
FIG. 14 is a block diagram of an image-processing device according to a third embodiment of the present invention.

FIG. 14 is a block diagram of an image-processing device according to a third embodiment of the present invention. In this image-processing device, an image characteristic extract unit 350A has a structure different from the structure of the image characteristic extract unit 350 of the image-processing device shown in FIG. 6. Except for this structure, this image-processing device shown in FIG. 14 has the same structure as the image-processing device shown in FIG. 6.

The image characteristic extract unit 350A equalizes the edge amounts calculated by the edge amount calculate unit 351 in an edge amount equalize unit 354. This equalization is performed, for example, by calculating an average value of the edge amounts of pixels in a 5×5 pixel field centered around a pixel being processed. The equalized edge amount is quantized in four values from 0 (non-edge field) to 3 (edge field) in the edge amount quantize unit 352, and is supplied to the quantization threshold produce unit 300A.

If a pixel having a large edge amount locally exists in a field having a small edge amount, performing the edge amount expanding process as does the image characteristic extract unit 350 shown in FIG. 6 enlarges an edge field so as to possibly cause the deterioration of granularity. By contrast, in this image-processing device, the average value of edge amounts is calculated in the edge amount equalize unit 354. Therefore, even if a pixel having a large edge amount locally exists, the influence thereof can be restrained. In addition, in an edge part of an image, since pixels having large edge amounts exist continuously therein, the equalization of the edge amounts does not lead to the deterioration of sharpness.

Embodiment 4

Figure 15:
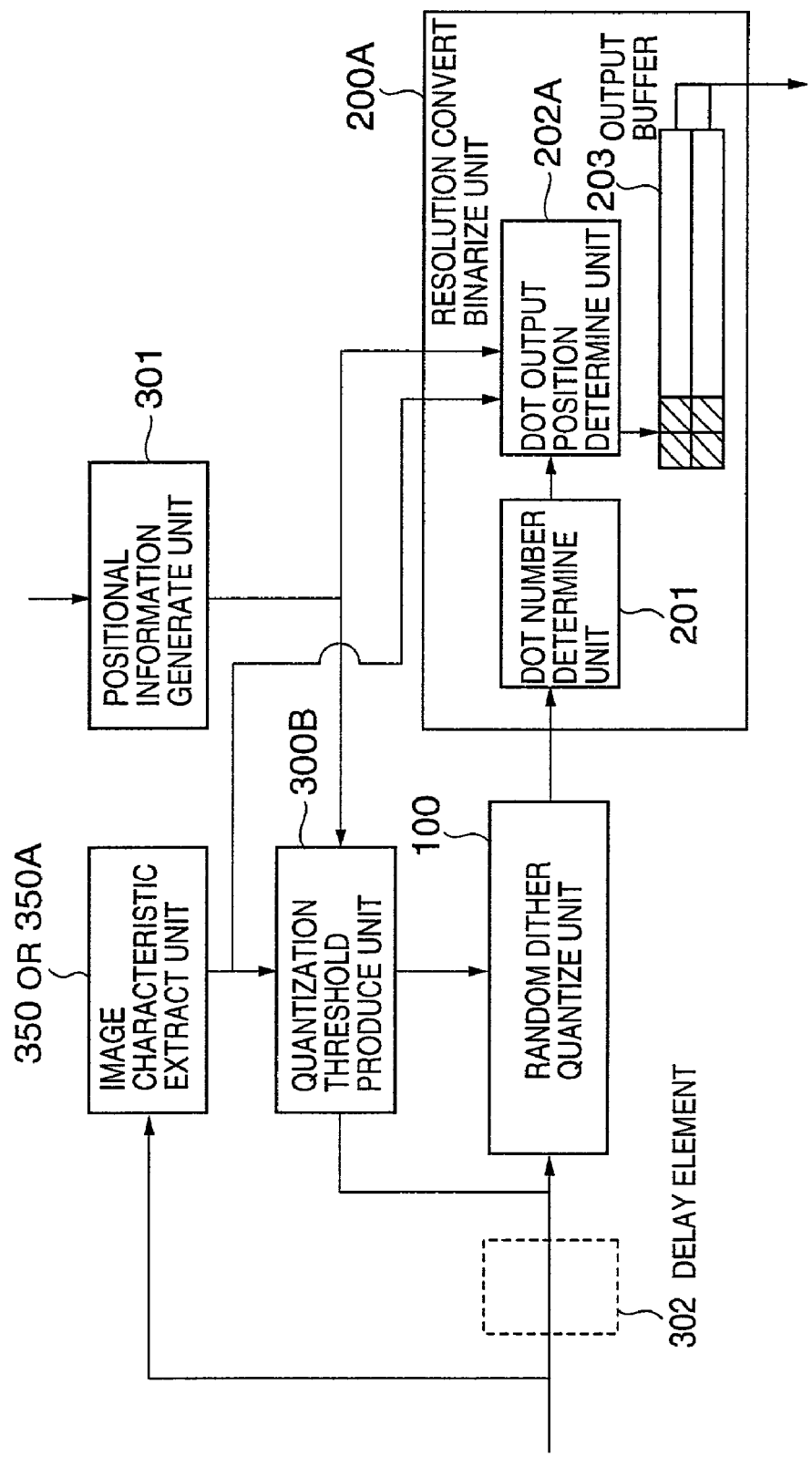
FIG. 15 is a block diagram of an image-processing device according to a fourth embodiment of the present invention.

FIG. 15 is a block diagram of an image-processing device according to a fourth embodiment of the present invention. In this image-processing device, the image characteristic extract unit 350 shown in FIG. 6 or the image characteristic extract unit 350A shown in FIG. 14 is used for the image characteristic extraction.

A quantization threshold produce unit 300B of this image-processing device performs the same operation as the quantization threshold produce unit 300A shown in FIG. 6 in a field where an edge amount output by the image characteristic extract unit 350 or 350A is 0, 1 or 2. However, in a field where the edge amount is 3 (edge field), the quantization threshold produce unit 300B does not produce constant quantization threshold values, but produces quantization threshold values varying such that the quantization number in the random dither quantize unit 100 becomes smaller as the input data has a larger value in a low-density range. Therefore, the input data of 600 dpi is also supplied to the quantization threshold produce unit 300B.

Figure 16:
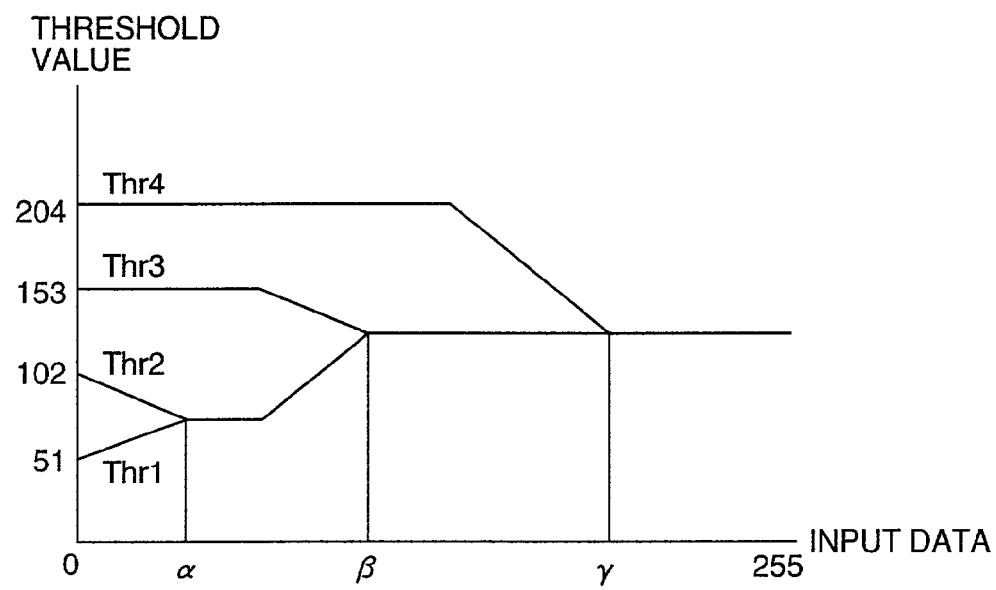
FIG. 16 is a graph showing relations between quantization threshold values produced for an edge field and values of input data.

More specifically, in a field where the edge amount is 3, quantization threshold values Thr1, Thr2, Thr3 and Thr4 supplied from the quantization threshold produce unit 300B vary according to values of the input data, for example as shown in FIG. 16. As seen in FIG. 16, when the input data is 0, Thr1 is 51, Thr2 is 102, Thr3 is 153, and Thr4 is 204; however, as the input data increases within a range lower than $\alpha$, Thr1 increases, and conversely Thr2 decreases. Then, when the input data is $\alpha$, Thr1 equals Thr2. That is, when the input data is in a range from 0 below $\alpha$, the input data is quantized in five values (0, 64, 128, 192, 255) by the random dither quantize unit 100; however, as the input data draws nearer to $\alpha$, the quantized data less probably becomes 64. Then, when the input data is in a range from $\alpha$ below $\beta$, Thr1 is equal to Thr2, and thus the input data is quantized in four values (0, 128, 192, 255), in which the quantized data never becomes 64. Likewise, when the input data is in a range from $\beta$ below $\gamma$, the input data is quantized in three values (0, 192, 255), and when the input data is in a range from $\gamma$ and above, the input data is quantized in two values (0, 255). The values $\alpha$, $\beta$ and $\gamma$ of the input data changing the quantization number can be selectively set as $\alpha=12$, $\beta=24$ and $\gamma=34$, for example, but are not necessarily be limited to these values.

This quantization threshold produce unit 300B may comprise a means for producing quantization threshold values, which varies in amplitude corresponding to edge amounts (0, 1, 2), according to a dither threshold matrix, as does the quantization threshold produce unit 300A shown in FIG. 6, and a means for producing quantization threshold values varying according to the input data, for example as shown in FIG. 16, when the edge amount is 3. The latter means can be realized for example as a look-up table using the values of the input data as retrieval information.

In addition, edge amount information output by the image characteristic extract unit 350 or 350A is supplied to a dot output position determine unit 202A of a resolution convert binarize unit 200A. According to the edge amount information, when the edge amount is 0, 1 or 2, the dot output position determine unit 202A performs the same operation as the dot output position determine unit 202 shown in FIG. 1. However, when the edge amount is 3 (edge field), the dot output position determine unit 202A outputs dots in a predetermined arranging order as shown in FIG. 17A to FIG. 17D. Specifically, in an edge field, when the number of dots is 1 (the quantized value=64), the dot output position determine unit 202A outputs a dot at a position shown in FIG. 17A; when the number of dots is 2 (the quantized value=128), the dot output position determine unit 202A outputs dots at positions shown in FIG. 17B; when the number of dots is 3 (the quantized value=192), the dot output position determine unit 202A outputs dots at positions shown in FIG. 17C; and when the number of dots is 4 (the quantized value=255), the dot output position determine unit 202A outputs dots at positions shown in FIG. 17D.

The dot output position determine unit 202A can be realized for example as a look-up table using the number of dots, the positional information, and the edge amount information (one bit indicating whether or not the edge amount is 3 suffices), as retrieval information. This look-up table can be unified with the look-up table of the dot number determine unit 201.

Figures 17A, 17B, 17C, 17D:
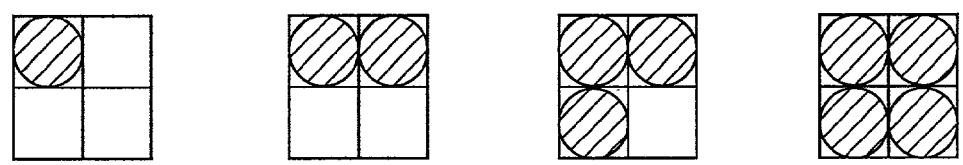
FIG. 17A to FIG. 17D are illustrations used for explaining orders of arranging dots in an edge field.

As described above, this image-processing device uses quantization threshold values varying such that the quantization number becomes smaller according to the input data, in an edge field. Accordingly, in a low-density part, small dots are output as shown in FIG. 17A or FIG. 17B. This enables the formation of an image with excellent sharpness where breaks in a line are inconspicuous in a low-contrast character or in a line drawing, and also enables the formation of an image with an excellent granularity with respect to dots in a low-density part. Additionally, dots are concentrated in a middle-density part and a high-density part in a non-edge field because of the use of the dither thresholds. Therefore, if small dots as shown in FIG. 17A or FIG. 17B are output in a middle-density part and a high-density part in an edge field, conspicuous incompatibility is likely at a part between the edge field and the non-edge field. However, in this image-processing device, concentrated dots (large dots) as shown in FIG. 17C or FIG. 17D are output in the high-density part in the edge field, as in the high-density part in the non-edge field. This prevents conspicuous incompatibility at a part between the edge field and the non-edge field. In addition, since large dots are output also as dots in the high-density part in the edge field, an image with excellent stability and gradation can be formed.

Despite of the above description that the quantization threshold values are varied according to the input data in an edge field, this does not only mean that the quantization threshold values are varied according to the input data of a pixel being processed, but also means that the quantization threshold values are varied according to an average value of the input data of a pixel being processed and adjacent pixels thereof (for example, 3×3 pixels centered around the pixel being processed). The latter is included in the present invention. This method using an average value of the input data has an advantage that the quantization number can be moderately varied even in a field where the density of the input data is sharply changed.

The above-described image-processing devices or the processes thereof according to the present invention can be realized by means of software using a general-purpose or dedicated-purpose computer. When using a dedicated-purpose computer, the computer reads a program to realize the function (the process step) of each of the units of the image-processing device in the computer from a recording medium, such as a magnetic disk, an optical disk, a magneto-optical disk and a semiconductor memory element; or the computer reads such a program from an external computer, etc. via a network. The present invention includes various recording mediums recording such a program.

The image-processing devices or the methods thereof according to the present invention are not limited to a single device, but are applicable to an image-forming device, such as a printer, a digital copying machine and a facsimile apparatus, a display device, an image scanner, etc. Hereinbelow, a description will be given of an example of an embodiment thereof.

Embodiment 5

Figure 18:
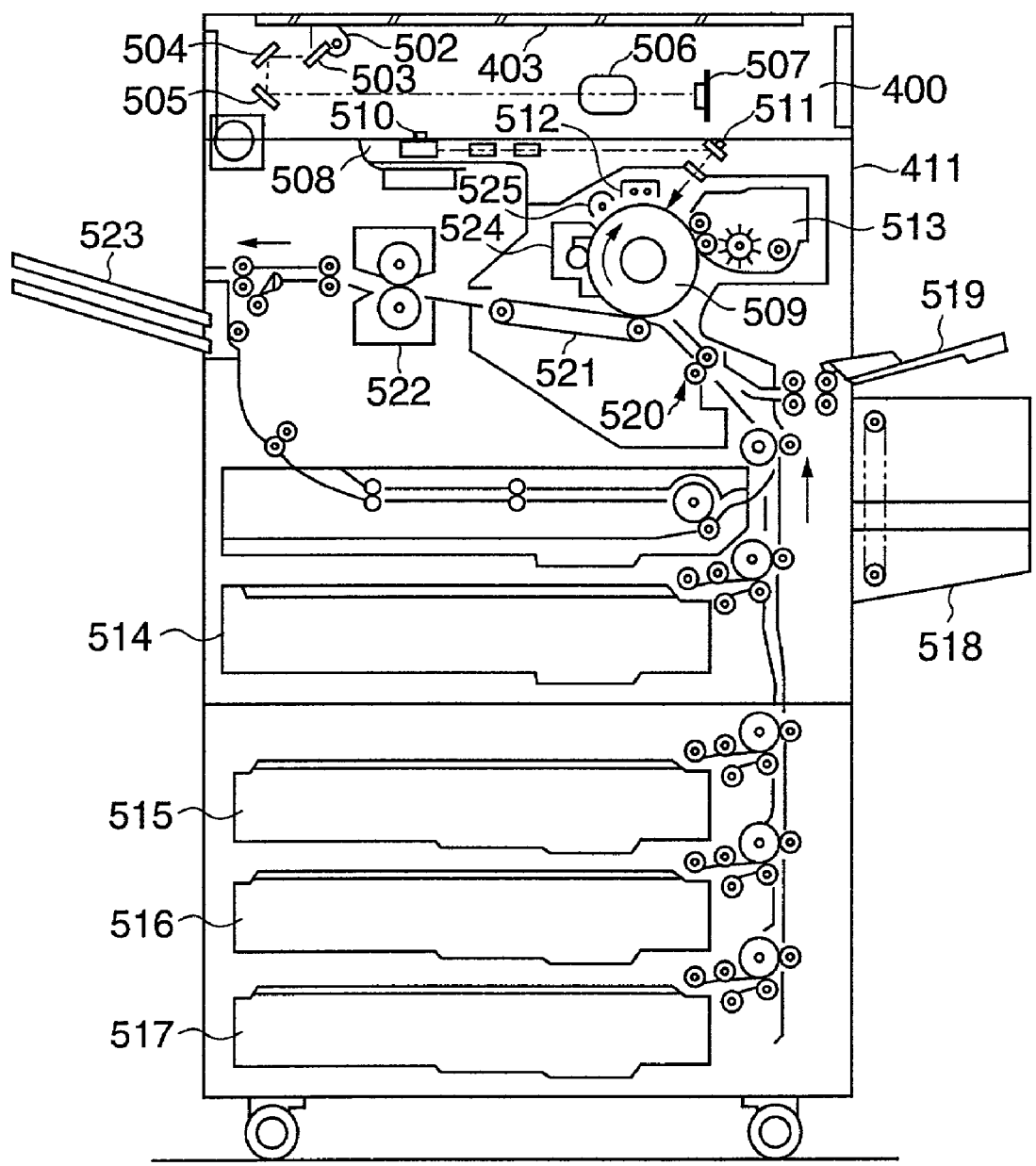
FIG. 18 is a cross-sectional view of a digital copying machine adopting the present invention.

FIG. 18 is a cross-sectional view of an example of a configuration of mechanisms for image-reading and image-forming, of a digital copying machine adopting the present invention. This digital copying machine comprises a scanner unit 400 as an image-reading unit, a laser printer unit 411 as an image-forming unit, and a circuit unit 550 (not shown in FIG. 18; a block diagram thereof shown in FIG. 19).

A subject copy, such as a bound manuscript, is placed on a flat subject copy stage 403. The scanner unit 400 illuminates the subject copy by an illumination lamp 502, and forms a reflected-light image thereof on a read sensor 507, such as a CCD, via mirrors 503, 504 and 505, and a lens 506. The scanner unit 400 also sub-scans the subject copy by moving the illumination lamp 502, and the mirrors 503, 504 and 505 so as to read image information of the subject copy and convert the image information into an electric image signal. The image signal output from the read sensor 507 is supplied to the circuit unit 550, and is processed therein. Image data output from the circuit unit 550 is sent to the laser printer unit 411 functioning as an image-forming means. The scanner unit 400 has a reading resolution of 600 dpi.

In the laser printer unit 411, a write optical unit 508 converts the image data supplied from the circuit unit 550 into an optical signal, and exposes an image support formed by a photosensitive member, such as a photosensitive drum 509, so as to form an electrostatic latent image corresponding to the subject copy image. The write optical unit 508 drives a semiconductor laser by a light-emission drive control unit according to the above-mentioned image data so that the semiconductor laser projects a laser beam having a modulated intensity. The write optical unit 508 performs a deflection scanning with this laser beam by using a revolving polygon mirror 510 so as to project the light beam on the photosensitive drum 509 via an f/θ lens and a reflective mirror 511. In a standard mode, an image-writing is performed with binary data (on/off of each dot) of 1200 dpi both in main-scanning and sub-scanning directions. There is another mode for writing with 2-bit data per dot, i.e., with four values, by performing a high-speed modulation of the writing laser beam. Furthermore, there are a mode for writing with 2400 dpi both in main-scanning and sub-scanning directions, and a mode for writing with pitches irregular in longitudinal and transverse directions, i.e., a 1200 dpi in a main-scanning direction and 600 dpi in a sub-scanning direction.

The photosensitive drum 509 is driven by a drive unit to revolve clockwise as indicated by an arrow in FIG. 18, and is electrified uniformly by a charger 512. Thereafter, the photosensitive drum 509 is exposed by the write optical unit 508 so that the electrostatic latent image is formed on the photosensitive drum 509. The electrostatic latent image formed on the photosensitive drum 509 is developed into a toner image by a developing device 513. A transfer paper (sheet/form) is fed from either of a plurality of paper-feed units 514 to 518, or a manual paper-feed unit 519 to a resist roller 520.

The resist roller 520 sends the transfer paper to a transfer belt 521 in synchronization with the toner image on the photosensitive drum 509. A transfer bias is applied from a transfer power source to the transfer belt 521 such that the transfer belt 521 transfers the toner image developed on the photosensitive drum 509 to the transfer paper, and conveys the transfer paper. The transfer paper bearing the toner image is conveyed by the transfer belt 521 to a fix unit 522, in which the toner image is fixed on the transfer paper. Thereafter, the transfer paper is delivered out to a delivery tray 523 as a copy. Besides, after the toner image is transferred from the photosensitive drum 509, the photosensitive drum 509 is cleaned by a cleaning device 524, and is discharged by a discharger 525, in preparation for the next image-forming operation.

Figure 19:
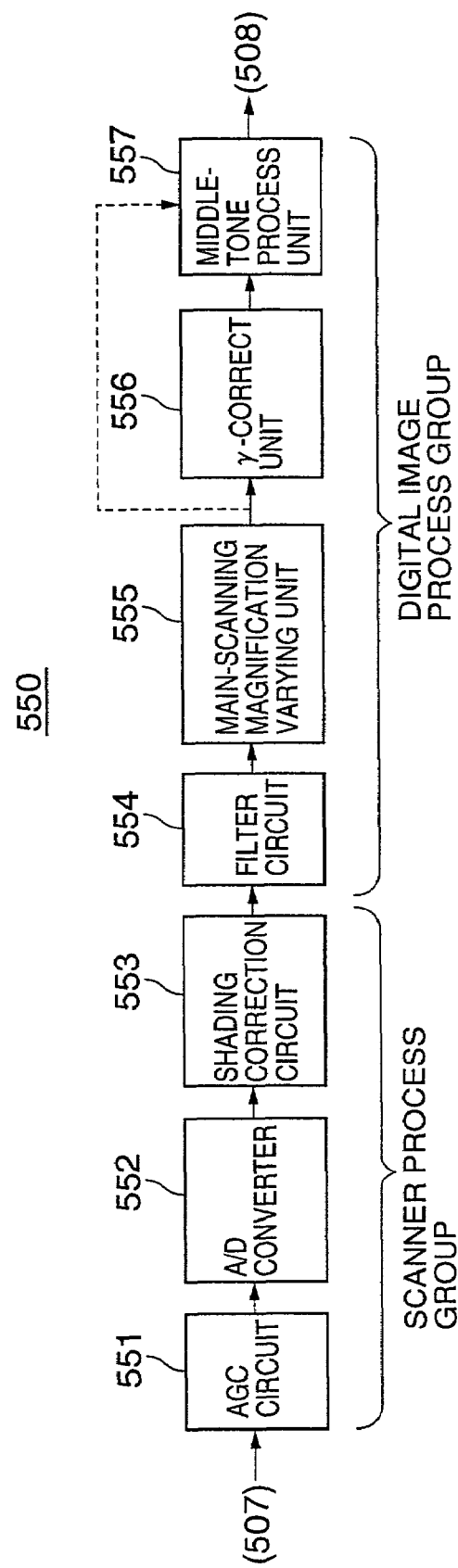
FIG. 19 is a block diagram of a circuit unit of the digital copying machine shown in FIG. 18.

FIG. 19 is an example of a block diagram of the circuit unit 550 of this digital copying machine. The input of the circuit unit 550 is an analog image signal read by the read sensor 507 of the scanner unit 400 in 600 dpi. The circuit unit 550 comprises a scanner process group (551 to 553) and a digital image process group (554 to 557) processing and correcting digital image data.

The analog image signal read by the read sensor 507 in 600 dpi is adjusted in level by an AGC circuit 551. Thereafter, the analog image signal is converted into digital data of 8 bits per pixel (256 gradations) by an A/D converter 552. Further, a shading correction circuit 553 corrects differences in sensitivity and illuminance between the digital data corresponding to pixels of the read sensor 507.

The image data after the shading correction is sent to a filter circuit 554, and undergoes a filtering process. Specifically, the image data undergoes an MTF correction correcting amplitude of an image resulting from the reading of the image, and a smoothing process for expressing a smooth middle-tone image. The image data after the filtering process is subjected to a process varying a magnification in a main-scanning direction according to a duplication magnification, by a main-scanning magnification varying unit 555. Then, the image data after the magnification varying process is subjected to a γ correction for converting the density of the image data into a writing density, by a γ-correct unit 556. The image data after the γ correction is sent to a middle-tone process unit 557. The image-processing device according to the present invention as shown in FIG. 1, FIG. 6, FIG. 14 or FIG. 15 is provided in this middle-tone process unit 557. When using the image-processing device including the image characteristic extract unit shown in FIG. 6, FIG. 14 or FIG. 15, it is generally preferable that the image data before undergoing the γ correction be supplied to the image characteristic extract unit, as indicated by a dashed line in FIG. 19. The image data processed in the middle-tone process unit 557 is sent, as data of 1 bit or 2 bits per dot, to the light-emission drive control unit of the semiconductor laser in the write optical unit 508. It is noted that, although many processes, such as a texture removing process, a flare removing process, and a graphic edition, are possible in the digital copying machine, descriptions thereof are omitted.

Hereinbelow, a description will be given of another example of such an image-forming device as a printer, a digital copying machine and a facsimile apparatus.

Figure 20:
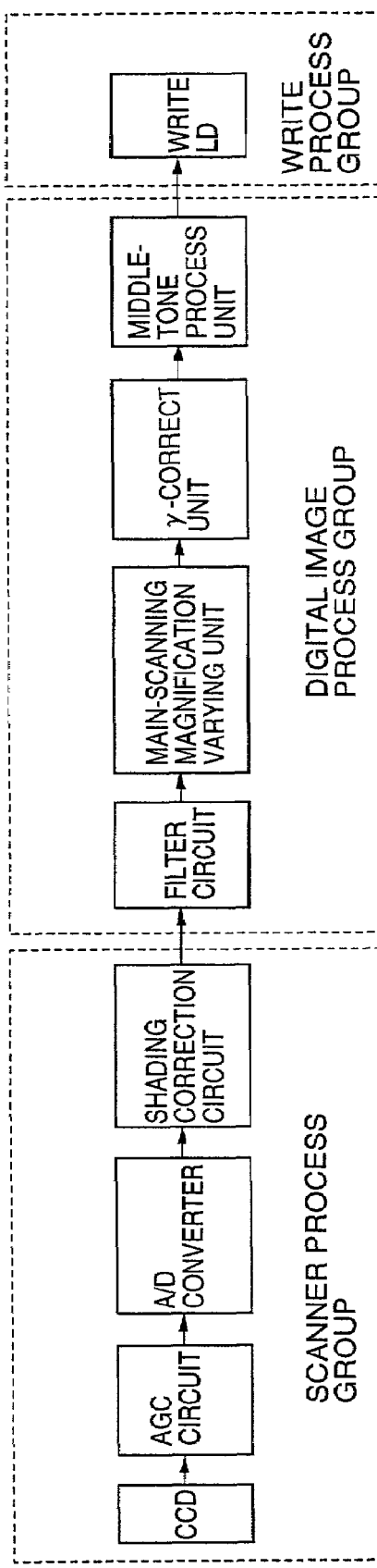
FIG. 20 is another example of a block diagram of an image-processing unit of the digital copying machine as an image-forming device according to the present invention.

FIG. 20 is another example of a block diagram of an image-processing unit of the digital copying machine as an image-forming device according to the present invention. The image-processing unit comprises a scanner process group correcting read data, a digital image process group processing and correcting digital image, and a write process group modulating a write LD.

In the scanner process group, analog data of 600 dpi read by a CCD is adjusted in data level by an AGC circuit. In an A/D converter, the analog data in pixels is converted into a digital value of 8 bits per pixel (0 (white) to 255 (black)). In a shading correction circuit, differences between pixels and illuminance degrees of the CCD are corrected. Then, in the digital image process group, a filter circuit performs an MTF correction correcting amplitude of an image resulting from the reading of the image, and a smoothing process for expressing a smooth middle-tone image. Subsequently, a main-scanning magnification varying unit varies a magnification in a main-scanning direction according to a duplication magnification. Then, a γ-correct unit performs a γ correction for converting the density of the image into a writing density. Finally, in a middle-tone process unit, the image data is converted into data of 1 bit or 2 bits per dot, and is sent to the write LD in the write process group. In addition to these processes, the image-processing unit performs other processes, such as a texture removing process, a flare removing process, a scanner γ, and a graphic edition (not shown in the figure).

Embodiment 6

In a sixth embodiment of the present invention, input data of 600 dpi (256 gradations) is subjected to a five-valued random dither process using dither threshold values so as to output the result of the quantization as dots on/off (binary image data) of 1200 dpi.

Figure 21:
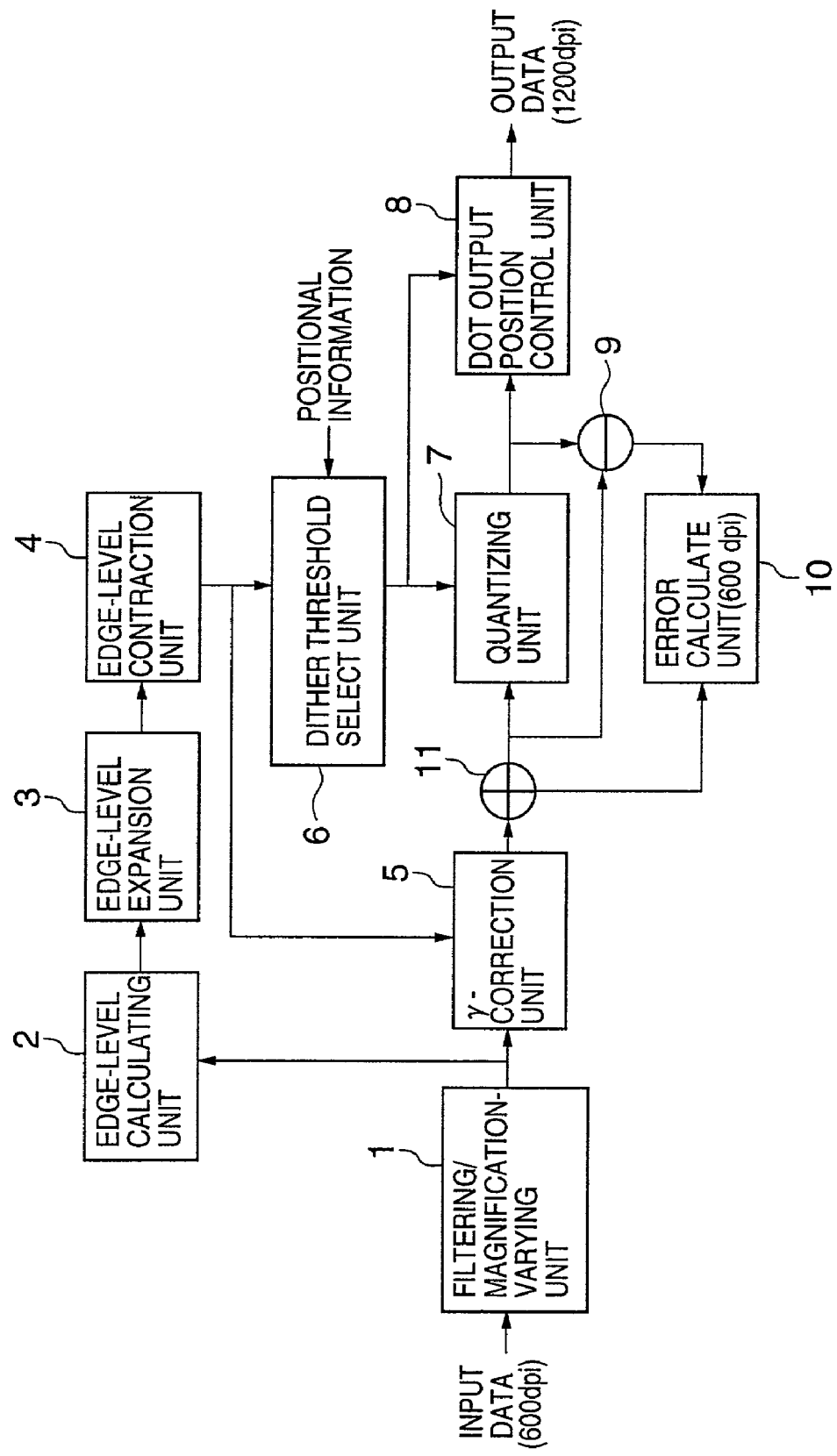
FIG. 21 is a block diagram showing a configuration of a sixth embodiment of the present invention.

FIG. 21 is a block diagram showing a configuration of the sixth embodiment of the present invention. After the input data of 600 dpi is subjected to a filtering process and a magnification varying process in a filtering/magnification-varying unit 1, an edge level is calculated in an edge-level calculating unit 2. In this edge-level calculating unit 2, the edge level is determined as either of a plurality of levels, with respect to each pixel of 600 dpi. Details of the edge-level calculating unit 2 are described later in this description. In the present embodiment, the edge level is either of two levels of 0 and 1. The edge level 1 indicates an edgier image than the edge level 0.

The calculated edge level undergoes an expanding process in an edge-level expansion unit 3. Specifically, the expanding process selects, as an edge level of a pixel being processed, the largest edge level from among edge levels in a predetermined field (hereinbelow referred to as a expansion field; for example, a 5×5 field centered around the pixel being processed). The edge level after the expanding process is subjected to a contracting process in an edge-level contraction unit 4. Specifically, the contracting process selects, as the edge level of the pixel being processed, the smallest edge level from among edge levels in a predetermined field (hereinbelow referred to as a contraction field; for example, a 5×5 field centered around the pixel being processed). The edge level after the contracting process is the eventual edge level of the pixel.

This edge level is used in switching γ-tables in a γ-correction unit 5 and dither threshold matrixes in a dither threshold select unit 6. The γ-correction unit 5 switches two γ-tables according to the edge level so as to perform a γ correction.

Figure 22:
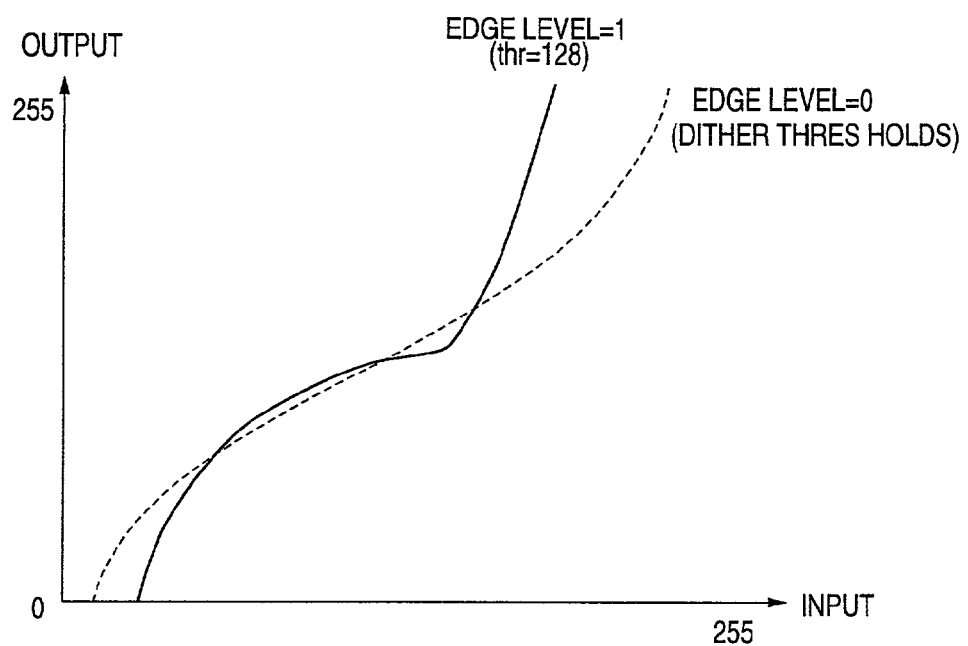
FIG. 22 shows an example of a γ-table.

FIG. 22 shows an example of the γ-table. When the edge level is 0, the correction is performed with a γ having a substantially linear property. When the edge level is 1, the correction is performed with a γ having a substantially sigmoid property.

When the edge level is 0, the dither threshold select unit 6 selects the four dither threshold matrixes shown in FIG. 3A to FIG. 3D (first dither threshold matrixes), and selects a value at a position on each of the matrixes corresponding to a position of the pixel being processed (recognized from positional information), as the quantization threshold values Thr1 to Thr4. When the edge level is 1, the dither threshold select unit 6 provides 128 (a constant threshold value) as the quantization threshold values Thr1 to Thr4.

A quantizing unit 7 performs a multivalued random dither process for quantizing the γ-corrected data in five values by using the threshold values determined in the dither threshold select unit 6.

More specifically, the random dither process is performed by an adder 11 for adding quantization errors of processed pixels to the multivalued image data, the quantizing unit 7 for quantizing output data of the adder 11 in five values by the four quantization threshold values Thr1, Thr2, Thr3 and Thr4 (Thr1<Thr2 <Thr3<Thr4), a subtracter 9 for calculating quantization errors from the input and the output of the quantizing unit 7, and an error calculate unit 10 calculating an error amount to be added to a pixel to be processed next from the quantization errors calculated by the subtracter 9 according to a predetermined error matrix, and adding the error amount to the adder 11.

The relations between the input value and the output value of the quantizing unit 7 are as follows: when input value<Thr1, output value=0; when Thr1≦input value<Thr2, output value=64; when Thr2 ≦input value<Thr3, output value=128; when Thr3≦input value<Thr4, output value=192; when Thr4 ≦input value, output value=255.

The 6×6 dither threshold matrix (3×3 for 600 dpi) as shown in FIG. 2 contains threshold values from 74 to 179 increasing by a step width of 3 arranged in a spiral form in the ascending order, which is a dot-concentrated type forming 200 lines of dots in 1200 dpi. In FIG. 2, four threshold values in each of solid-line grids correspond to one pixel of 600 dpi. As shown in FIG. 2, the smallest four threshold values (74, 77, 80, 83) in this dither threshold matrix are arranged at different pixel positions of 600 dpi. Regarding the 2×2 pixels (valued 110, 107, 113, 80) at the top-left grid in FIG. 2, the smallest value of 80 is allocated to the top-left pixel in FIG. 3A, the second smallest value of 107 is allocated to the top-left pixel in FIG. 3B, the third smallest value of 110 is allocated to the top-left pixel in FIG. 3C, and the largest value of 113 is allocated to the top-left pixel in FIG. 3D.

The dither threshold select unit 6 outputs four threshold values corresponding to one pixel of 600 dpi in this dither threshold matrix as quantization threshold values corresponding to the pixel. For example, at the top-left pixel position, the dither threshold select unit 6 outputs the smallest threshold value of 80 among the four threshold values (80, 107, 110, 113) at this position as the quantization threshold value Thr1, the second smallest threshold value of 107 as the quantization threshold value Thr2, the third smallest threshold value of 110 as the quantization threshold value Thr3, and the largest threshold value of 113 as the quantization threshold value Thr4.

FIG. 3A to FIG. 3D are the 3×3 dither threshold matrixes containing the threshold values in the dither threshold matrix shown in FIG. 2 rearranged in pixel positions of 600 dpi for each of the quantization threshold values. FIG. 3A corresponds to the quantization threshold value Thr1. FIG. 3B corresponds to the quantization threshold value Thr2. FIG. 3C corresponds to the quantization threshold value Thr3. FIG. 3D corresponds to the quantization threshold value Thr4.

A dot output position control unit 8 converts the five-valued data of 600 dpi quantized by the random dither process into dots on/off (binary image data) of 2×2 pixels of 1200 dpi.

First, the dot output position control unit 8 calculates the number of dots to be output. Specifically, the dot output position control unit 8 determines the number of dot-on pixels in 2×2 pixels on the binary image data of 1200 dpi which correspond to each pixel on the multivalued image data of 600 dpi. Specifically, the dot output position control unit 8 obtains 0 when the value of the quantized data (the result of the five-valued quantization) is 0, obtains 1 when the quantized data value is 64, obtains 2 when the quantized data value is 128, obtains 3 when the quantized data value is 192, and obtains 4 when the quantized data value is 255, as the number of dots.

Next, the dot output position control unit 8 determines output positions of the dots. Specifically, the dot output position control unit 8 determines an arrangement of the determined number of the dots in the 2×2 pixels of 1200 dpi, according to a position on the dither threshold matrix (FIG. 2: a second dither threshold matrix) corresponding to each pixel being processed.

As a more specific example, when the pixel at the top-left position in the dither threshold matrix shown in FIG. 2 is being processed, the dot output position control unit 8 locates a first dot at a position of the smallest threshold value among the 2×2 threshold values at the top-left position, locates a second dot at a position of the second smallest threshold value, locates a third dot at a position of the third smallest threshold value, and locates a last dot at a position of the largest threshold value. In this example, when the number of dots is 2, the dots are output at two pixel positions (threshold values of 80 and 107) at the right side in the 2×2 pixels, as shown in FIG. 4A (the two pixels are dot-on pixels). If the number of dot(s) is 1, the dot is output at the bottom-right pixel position. If the number of dots is 3, the dots are output at the top-left pixel position as well as the two pixel positions at the right side. Similarly, when the pixel at the top-middle position in the dither threshold matrix shown in FIG. 2 is being processed, if the number of dots is 2, the dots are output at two pixel positions (threshold values of 77 and 98) at the bottom, as shown in FIG. 4B. As described above, by changing the order of outputting (arranging) the dots according to a position on the dither threshold matrix corresponding to each pixel being processed, dots can be easily formed.

As described above, when the edge level is 0 (less edgier field), dots are formed by using the dither threshold values; therefore, an image having an excellent granularity and stability can be formed. On the other hand, when the edge level is 1 (edgy field), dots are formed by using the constant threshold values; therefore, an image with an excellent sharpness can be formed in a text part, and moirés can be prevented from occurring in a halftone (dot) image.

A detailed description will be given of the edge-level calculating unit 2. FIG. 23 is a process flowchart of the edge-level calculating unit 2. First, edge amounts of each pixel of 600 dpi are calculated by edge extraction filters shown in FIG. 24A to FIG. 24D (step 101). FIG. 24A shows a filter extracting an edge of a longitudinal line. FIG. 24B shows a filter extracting an edge of a transverse line. FIG. 24C and FIG. 24D show filters each extracting an edge of a slant line. Specifically, the edge amounts calculated by the filters shown in FIG. 24A to FIG. 24D are multiplied by corresponding coefficients. For example, a coefficient corresponding to the filters shown in FIG. 24A and FIG. 24B is 2, and a coefficient corresponding to the filters shown in FIG. 24C and FIG. 24D is 1. The largest amount among the edge amounts multiplied by the corresponding coefficients is the edge amount of the pixel.

Next, it is judged whether or not the pixel being processed belongs to a white-background field (step 102). When white pixels equal to or more than a predetermined number (for example, 6) exist in a predetermined field (for example, a 5×5 field) centered around the pixel being processed, it is judged that the pixel being processed does belong to a white-background field. Here, the white pixel is preferred to be defined in consideration of noises, for example as a pixel having data (density) equal to or less than 5.

Subsequently, edge-amount threshold values are switched according to the result of the white-background judgment in the step 102 (steps 103, 104), and the calculated edge amount is quantized in a plurality of levels (step 105). When the pixel being processed belongs to a white-background field (Yes in the step 102), lower quantization threshold values are used (the step 103) than when the pixel being processed does not belong to a white-background field (No in the step 102; the step 104). This switching is performed so as to make it easy for a low-density character having a relatively low edge amount to be judged as an edge (since many white pixels exist in the periphery of a character field, low threshold values are to be selected). Finally, it is judged whether or not the pixel being processed is a black pixel (step 106). When data of the pixel being processed is equal to or more than a predetermined value (Yes in the step 106), it is judged that the pixel being processed is a black pixel, and the edge level of the pixel is made the maximum level (edge level=1 in the present embodiment) (step 107). This makes it easy for a high-density halftone (dot) part having a relatively low edge amount to be judged as an edge.

As described above, in the present embodiment, the edge level is calculated, and the dither threshold values are switched according to the edge level when performing the quantization; thereby, an image maintaining both an excellent granularity and sharpness can be formed. Especially, in the present embodiment, since the edge level is calculated from the image data just before the γ correction, there is an advantage that the data subjected to the filtering process and the magnification varying process can be quantized by using optimal threshold values.

Besides, the edge extraction filters shown in FIG. 24A to FIG. 24D can be replaced by other filters, such as the filters shown in FIG. 13A to FIG. 13C. FIG. 13A shows a filter extracting an edge of a longitudinal line. FIG. 13B shows a filter extracting an edge of a transverse line. FIG. 13C and FIG. 24D show filters each extracting edges of dots and a slant line. Using these filters enables extracting a relatively large edge amount in a halftone (dot) image.

Embodiment 7

In a seventh embodiment of the present invention, process parameters are switched according to an output mode.

FIG. 25 is a block diagram showing a configuration of the seventh embodiment of the present invention. The output mode is designated by an operator. The present embodiment sets forth two output modes: a "text mode" designed primarily for a text image; and a "text/photograph mode" appropriate for an image containing both a text and a photograph.

First, as in the above-described sixth embodiment, input data is subjected to a filtering process and a magnification varying process in a filtering/magnification-varying unit 21, and based on this processed input data, an edge level is calculated by quantizing an edge amount in a plurality of levels in an edge-level calculating unit 22. However, in the present embodiment, the edge level is either of four levels from 0 to 3 (the edge level 3 indicates the edgiest image among the four edge levels). The edge level undergoes an expanding process with respect to a predetermined field, in the same manner as in the above-described sixth embodiment, in an edge-level expansion unit 23. The edge level after the expanding process is subjected to a-contracting process in an edge-level contraction unit 24, as in the above-described sixth embodiment; however, in the present embodiment, the contraction field is switched according to the output mode. Specifically, in the text mode, the contraction field is 1×1 (no contracting process performed), and in the text/photograph mode, the contraction field coincides with the expansion field. By switching the contraction field according to the output mode as described above, the number of fields having a large edge level is increased in the text mode so as to emphasize sharpness; and in the text/photograph mode, switching the contraction field prevents the number of fields having a large edge level from increasing excessively.

The edge level after the contracting process is sent to a γ-correction unit 25 and a dither threshold amplitude control unit 26. The γ-correction unit 25 switches γ-tables according to the edge level. However, in the present embodiment, γ-tables do not need to be switched according to each of the four edge levels; for example, two γ-tables may be switched according to the edge levels 0 or 1 and 2 or 3. Besides, when two γ-tables are switched, the two γ-tables are switched as in the sixth embodiment.

Additionally, the dither threshold amplitude control unit 26 determines amplitude (a step width) of a dither threshold matrix. The step width is represented by A=(3 minus the edge level). That is, when the edge level is 0 (the least edgiest field), the step with is 3; as the edge level becomes larger, the step width A becomes smaller; and when the edge level is 3 (the edgiest field), the step width becomes 0.

Next, a dither threshold calculation unit 27 calculates a dither threshold matrix. First, a dither coefficient matrix is selected according to the output mode designated by an operator. FIG. 26 shows a dither coefficient matrix corresponding to the text mode. FIG. 27 shows a dither coefficient matrix corresponding to the text/photograph mode. A dither threshold matrixes for 1200 dpi is obtained by adding 128 to each of products obtained by multiplying the selected dither coefficient matrix by the step width A determined by the dither threshold amplitude control unit 26.

FIG. 28 shows a dither threshold matrix for 1200 dpi calculated from the dither coefficient matrix corresponding to the text mode (FIG. 26) with the step width A=3. From this dither threshold matrix for 1200 dpi, four 3×5 dither threshold matrixes for 600 dpi (FIG. 29A to FIG. 29D) are created, as in the above-described sixth embodiment. By using these dither threshold matrixes, the γ-corrected data is quantized in five values, and is converted into binary image data of 1200 dpi.

A further description will be given of the dither coefficient matrixes shown in FIG. 26 and FIG. 27. Whereas FIG. 26 shows that the smallest four coefficients (−17) are arranged in a same pixel of 600 dpi, FIG. 27 shows that the smallest four coefficients (−18 to −15) are arranged in different pixels of 600 dpi. In the arrangement shown in FIG. 26, the pixel containing the four coefficients of −17 consequently has equal four threshold values such that the pixel is output with all four dots being either on or off. Thereby, whereas a low-density part in an image comes to have a deteriorated granularity, a part including both a field having a large edge level and a field having a small edge level comes to have less incompatibility. On the other hand, in the arrangement shown in FIG. 27, when the pixel including the coefficient of −16 has a dot-on, a negative error is diffused to peripheral pixels such that the pixels including the coefficients of −18, −17, and −15 tend to have a dot-off. Thereby, a low-density part in an image comes to have an excellent granularity, because the minimum one dot can be output. In the text mode, for the purpose of preventing an offset, a γ having 0 (white) at a low-density side is often used. In this case, the dither coefficient matrix shown in FIG. 26 is used, with placing greater stress on incompatibility at a part including both a field having a large edge level and a field having a small edge level than granularity at a low-density part. In the text/photograph mode, the dither coefficient matrix shown in FIG. 27 is used, with placing greater stress on granularity at a low-density part.

As described above, the present embodiment exhibits both granularity and sharpness in an image. Also, in the present embodiment, since process parameters are switched according to the output mode designated by an operator, an optimal image for the output mode can be formed.

Besides, in FIG. 25, a quantizing unit 28, a dot output position control unit 29, a subtracter 30, an error calculate unit 31, and an adder 32 function in the same manner as the quantizing unit 7, the dot output position control unit 8, the subtracter 9, the error calculate unit 10, and the adder 11, respectively.

Although the present embodiment sets forth an example where the arrangement of coefficients for the dither threshold matrix differs according to the output mode, the present invention includes other examples as follows: coefficients for the dither threshold matrix are switched according to the output mode (e.g., in the text mode, a matrix having small amplitude is selected, and in the text/photograph mode, a matrix having large amplitude is selected); the size of the dither threshold matrix is switched according to the output mode (e.g., in the text mode, a matrix having a small size is selected, and in the text/photograph mode, a matrix having a large size is selected).

In addition, the present invention may be embodied not only by using dedicated-purpose hardware, as described above, but also can be realized by means of software (programs) using a general-purpose computer. When the present invention is embodied by means of software, programs to realize the image-processing functions (such as the edge-level calculation, the γ correction, and the multivalued random dither) and the process procedures of the present invention are recorded in recording media, and a computer system reads the programs from the recording media, in which a CPU thereof executes the programs so as to realize the image-processing procedures of the present invention. Besides, the input image data is read from a subject copy via a scanner, etc., or is preliminarily prepared in a hard disk. Alternatively, the input image data is read via a network. Further, the binary image data of high resolution is output to a laser printer or is output to an external computer, etc., via a network.

The present invention is not limited to the specifically disclosed embodiments, and variations and modifications may be made without departing from the scope of the present invention.

The present application is based on Japanese priority applications No. 2000-377713 filed on Dec. 12, 2000 and No. 2001-150608 filed on May 21, 2001, the entire contents of which are hereby incorporated by reference.

What is claimed is:

1. An image-processing device comprising:
   a quantization threshold produce unit producing a plurality of quantization threshold values corresponding to each of pixels of multivalued image data according to a dither threshold matrix;
   a random dither quantize unit quantizing said multivalued image data in multivalues by a random dither process using said quantization threshold values so as to output quantized data;

a resolution convert binarize unit converting said quantized data into binary image data having a resolution higher than a resolution of said multivalued image data; and an image characteristic extract unit extracting an image characteristic of said multivalued image data, wherein said quantization threshold produce unit controls an amplitude of said quantization threshold values according to a characteristic amount output by said image characteristic extract unit, and wherein said resolution convert binarize unit determines the number of dot-on pixels to be output in a plural-pixel field of said binary image data according to a value of the quantized data of a pixel being processed of said multivalued image data, the plural-pixel field corresponding to said pixel being processed, and controls the order of arranging said dot-on pixels in said plural-pixel field according to a position on said dither threshold matrix corresponding to said pixel being processed.

2. The image-processing device as claimed in claim 1, wherein said order of arranging said dot-on pixels is controlled so as to form dots of a dot-concentrated type.

3. The image-processing device as claimed in claim 2, wherein said dither threshold matrix contains threshold values so arranged as to form the dots of the dot-concentrated type.

4. The image-processing device as claimed in claim 3, wherein smallest four threshold values among said threshold values in said dither threshold matrix are arranged at different pixel positions.

5. The image-processing device as claimed in claim 4, wherein the difference between a fourth smallest threshold value and a fifth smallest threshold value in said dither threshold matrix is larger than a step width of said dither threshold matrix.

6. The image-processing device as claimed in claim 3, wherein said dither threshold matrix comprises at least two basic dither threshold matrixes containing the threshold values so arranged as to form the dots of the dot-concentrated type, the two basic dither threshold matrixes being joined in a main scanning direction at a position shifted in a sub-scanning direction.

7. The image-processing device as claimed in claim 1, wherein said quantization threshold produce unit controls the amplitude of said quantization threshold values by switching said dither threshold matrix used for producing said quantization threshold values.

8. The image-processing device as claimed in claim 1, wherein said image characteristic extract unit outputs an edge amount of said multivalued image data as said characteristic amount, and said quantization threshold produce unit makes the amplitude of said quantization threshold values smaller as said edge amount becomes larger.

9. The image-processing device as claimed in claim 8, wherein said image characteristic extract unit outputs the edge amount of said multivalued image data after subjecting the edge amount to an expanding process for expanding an edge field of said multivalued image data.

10. The image-processing device as claimed in claim 8, wherein said image characteristic extract unit outputs the edge amount of said multivalued image data after equalizing the edge amount.

11. The image-processing device as claimed in claim 8, wherein said quantization threshold produce unit produces a constant value as the quantization threshold values when said edge amount output by said image characteristic extract unit is maximum.

12. The image-processing device as claimed in claim 8, wherein said quantization threshold produce unit produces values varying according to a value of said multivalued image data as the quantization threshold values when said edge amount output by said image characteristic extract unit is maximum.

13. The image-processing device as claimed in claim 12, wherein said value of said multivalued image data is an average value in the pixel being processed and adjacent pixels thereof.

14. The image-processing device as claimed in claim 12, wherein said quantization threshold produce unit varies said values varying according to the value of said multivalued image data such that said random dither quantize unit quantizes said multivalued image data in a smaller number of multivalues as the value of said multivalued image data becomes larger.

15. The image-processing device as claimed in claim 14, wherein said resolution convert binarize unit arranges said dot-on pixels in said plural-pixel field according to a predetermined arranging order when said edge amount output by said image characteristic extract unit is maximum.

16. The image-processing device as claimed in claim 1, further comprising an image-forming unit forming an image according to said binary image data.

17. The image-processing device as claimed in claim 1, further comprising an image-reading unit reading said multivalued image data by optically scanning a subject copy, and an image-forming unit forming an image according to said binary image data.

18. The image-processing device as claimed in claim 1, wherein said random dither quantize unit comprises an error diffusion calculate unit for error diffusion calculation.

19. An image-processing device for converting quantized data of multivalued image data into binary image data having a resolution higher than a resolution of said multivalued image data, the quantized data being obtained by quantizing said multivalued image data in multivalues by a random dither process using a plurality of quantization threshold values produced according to a dither threshold matrix, the image-processing device comprising:

a dot number determine unit determining the number of dot-on pixels to be output in a plural-pixel field of said binary image data according to a value of the quantized data of a pixel being processed of said multivalued image data, the plural-pixel field corresponding to said pixel being processed; and a dot output position determine unit controlling the order of arranging said number of said dot-on pixels in said plural-pixel field according to a position on said dither threshold matrix corresponding to said pixel being processed, wherein an image characteristic of said multivalued image data is extracted to control an amplitude of the plurality of quantization threshold values.

20. The image-processing device as claimed in claim 19, wherein said order of arranging said number of said dot-on pixels in said plural-pixel field is controlled so as to form dots of a dot-concentrated type.

21. The image-processing device as claimed in claim 19, wherein said dot output position determine unit is supplied with information indicating an edge field so that said dot output position determine unit arranges said dot-on pixels in a plural-pixel field of said binary image data according to a predetermined arranging order, the plural-pixel field corresponding to a pixel in the edge field of said multivalued image data.

22. The image-processing device as claimed in claim 19, further comprising an image-forming unit forming an image according to said binary image data.

23. The image-processing device as claimed in claim 19, wherein the random dither process includes error diffusion calculation.

24. A computer readable recording medium storing program code for causing a computer to process an image, the recording medium comprising:
   quantization-threshold-produce program code means for producing a plurality of quantization threshold values corresponding to each of pixels of multivalued image data according to a dither threshold matrix;
   random-dither-quantize program code means for quantizing said multivalued image data in multivalues by a random dither process using said quantization threshold values so as to output quantized data;
   resolution-convert-binarize program code means for converting said quantized data into binary image data having a resolution higher than a resolution of said multivalued image data; and
   image-characteristic-extract program code means for extracting an image characteristic of said multivalued image data,
   wherein an amplitude of said quantization threshold values of said quantization-threshold-produce-code means is controlled according to a characteristic amount output by said image-characteristic-extract program code means, and
   wherein said resolution-convert-binarize program code means determines the number of dot-on pixels to be output in a plural-pixel field of said binary image data according to a value of the quantized data of a pixel being processed of said multivalued image data, the plural-pixel field corresponding to said pixel being processed, and controls the order of arranging said dot-on pixels in said plural-pixel field according to a position on said dither threshold matrix corresponding to said pixel being processed.

25. The computer readable recording medium as claimed in claim 24, wherein the random dither process includes error diffusion calculation.

26. A computer readable recording medium storing program code for causing a computer to convert quantized data of multivalued image data into binary image data having a resolution higher than a resolution of said multivalued image data, the quantized data being obtained by quantizing said multivalued image data in multivalues by a random dither process using a plurality of quantization threshold values produced according to a dither threshold matrix, the recording medium comprising:
   dot-number-determine program code means for determining the number of dot-on pixels to be output in a plural-pixel field of said binary image data according to a value of the quantized data of a pixel being processed of said multivalued image data, the plural-pixel field corresponding to said pixel being processed;
   dot-output-position-determine program code means for controlling the order of arranging said number of said dot-on pixels in said plural-pixel field according to a position on said dither threshold matrix corresponding to said pixel being processed; and
   an image-characteristic-extract step of extracting an image characteristic of said multivalued image data,
   wherein an amplitude of said quantization threshold values is controlled according to a characteristic amount output in the image-characteristic-extract step.

27. The computer readable recording medium as claimed in claim 26, wherein the random dither process includes error diffusion calculation.

28. An image processing method comprising:
   a quantization-threshold-producing step of producing a plurality of quantization threshold values corresponding to each of pixels of multivalued image data according to a dither threshold matrix;
   a quantizing step of quantizing said multivalued image data in multivalues by a random dither process using said quantization threshold values so as to generate quantized data;
   a converting step of converting said quantized data into binary image data having a resolution higher than a resolution of said multivalued image data; and
   an image-characteristic-extract step of extracting an image characteristic of said multivalued image data,
   wherein an amplitude of said quantization threshold values is controlled according to a characteristic amount output in the image-characteristic-extract step; and
   wherein said converting step includes determining the number of dot-on pixels to be output in a plural-pixel field of said binary image data according to a value of the quantized data of a pixel being processed of said multivalued image data, the plural-pixel field corresponding to said pixel being processed, and includes controlling the order of arranging said dot-on pixels in said plural-pixel field according to a position on said dither threshold matrix corresponding to said pixel being processed.

29. The image-processing method as claimed in claim 28, wherein said order of arranging said dot-on pixels is controlled so as to form dots of a dot-concentrated type.

30. The image-processing method as claimed in claim 29, wherein the random dither process includes error diffusion calculation.

31. The image-processing method as claimed in claim 28, further comprising an image-characteristic-extracting step of extracting an image characteristic of said multivalued image data, wherein said quantization-threshold-producing step controls amplitude of said quantization threshold values according to a characteristic amount extracted by said image-characteristic-extracting step.

32. The image-processing method as claimed in claim 31, wherein said image-characteristic-extracting step extracts an edge amount of said multivalued image data as said characteristic amount, and said quantization-threshold-producing step makes the amplitude of said quantization threshold values smaller as said edge amount becomes larger.

33. The image-processing method as claimed in claim 32, wherein said image-characteristic-extracting step extracts, as said characteristic amount, the edge amount subjected to an expanding process for expanding an edge field of said multivalued image data.

34. The image-processing method as claimed in claim 32, wherein said image-characteristic-extracting step extracts, as said characteristic amount, the edge amount being equalized.

35. The image-processing method as claimed in claim 32, wherein said quantization-threshold-producing step produces a constant value as the quantization threshold values when said edge amount extracted by said image-characteristic-extracting step is maximum.

36. The image-processing method as claimed in claim 32, wherein said quantization-threshold-producing step produces values varying according to a value of said multivalued image data as the quantization threshold values when said edge amount extracted by said image-characteristic-extracting step is maximum.

37. The image-processing method as claimed in claim 36, wherein said value of said multivalued image data is an average value in the pixel being processed and adjacent pixels thereof.

38. The image-processing method as claimed in claim 36, wherein said quantization-threshold-producing step varies said values varying according to the value of said multivalued image data such that said quantizing step quantizes said multivalued image data in a smaller number of multivalues as the value of said multivalued image data becomes larger.

39. The image-processing method as claimed in claim 38, wherein said converting step includes arranging said dot-on pixels in said plural-pixel field according to a predetermined arranging order when said edge amount extracted by said image-characteristic-extracting step is maximum.

40. An image-processing method for converting quantized data of multivalued image data into binary image data having a resolution higher than a resolution of said multivalued image data, the quantized data being obtained by quantizing said multivalued image data in multivalues by a random dither process using a plurality of quantization threshold values produced according to a dither threshold matrix, the image-processing method comprising:

a dot-number-determining step of determining the number of dot-on pixels to be output in a plural-pixel field of said binary image data according to a value of the quantized data of a pixel being processed of said multivalued image data, the plural-pixel field corresponding to said pixel being processed; and a dot-output-position-determining step of controlling the order of arranging said number of said dot-on pixels in said plural-pixel field according to a position on said dither threshold matrix corresponding to said pixel being processed, wherein an image characteristic of said multivalued image data is extracted to control an amplitude of the plurality of quantization threshold values.

41. The image-processing method as claimed in claim 40, wherein said order of arranging said number of said dot-on pixels in said plural-pixel field is controlled so as to form dots of a dot-concentrated type.

42. The image-processing method as claimed in claim 40, wherein said dot-output-position-determining step arranges said dot-on pixels in a plural-pixel field of said binary image data according to a predetermined arranging order, the plural-pixel field corresponding to a pixel in an edge field of said multivalued image data.

43. The image-processing method as claimed in claim 40, wherein the random dither process includes error diffusion calculation.

* * * * *